US009316495B2

(12) United States Patent
Suzuki et al.

(10) Patent No.: US 9,316,495 B2
(45) Date of Patent: Apr. 19, 2016

(54) DISTANCE MEASUREMENT APPARATUS

(71) Applicants: Shuichi Suzuki, Kanagawa (JP);
Kenichi Yoshimura, Kanagawa (JP);
Mitsuru Nakajima, Kanagawa (JP);
Yusuke Hayashi, Kanagawa (JP)

(72) Inventors: Shuichi Suzuki, Kanagawa (JP);
Kenichi Yoshimura, Kanagawa (JP);
Mitsuru Nakajima, Kanagawa (JP);
Yusuke Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 308 days.

(21) Appl. No.: 13/962,196

(22) Filed: Aug. 8, 2013

(65) Prior Publication Data

US 2014/0071428 A1    Mar. 13, 2014

(30) Foreign Application Priority Data

Sep. 13, 2012    (JP) .................................. 2012-201054

(51) Int. Cl.
*G01C 3/08*    (2006.01)
*G01S 17/00*    (2006.01)
*G01S 7/484*    (2006.01)
*G01S 7/486*    (2006.01)

(52) U.S. Cl.
CPC . *G01C 3/08* (2013.01); *G01S 7/484* (2013.01); *G01S 7/4863* (2013.01); *G01S 17/00* (2013.01)

(58) Field of Classification Search
CPC ........ G01S 17/02; G01S 17/10; G01S 7/4811
USPC ............................... 356/3.01–5.15
See application file for complete search history.

(56) References Cited

U.S. PATENT DOCUMENTS

| 5,314,037 | A | | 5/1994 | Shaw et al. |
| 6,163,371 | A | * | 12/2000 | Kato et al. .................... 356/4.03 |
| 6,587,183 | B1 | * | 7/2003 | Uomori et al. ................. 356/3.1 |
| 2003/0169414 | A1 | * | 9/2003 | Benz et al. ..................... 356/5.1 |
| 2009/0048727 | A1 | | 2/2009 | Hong et al. |
| 2013/0077083 | A1 | | 3/2013 | Suzuki et al. |
| 2013/0120734 | A1 | | 5/2013 | Ogata et al. |

FOREIGN PATENT DOCUMENTS

| CN | 101490503 A | 7/2009 |
| CN | 101718619 A | 6/2010 |
| CN | 101813778 A | 8/2010 |
| JP | 61-246711 | 11/1986 |
| JP | 2-290507 | 11/1990 |
| JP | 7-146353 | 6/1995 |

(Continued)

OTHER PUBLICATIONS

Extended European Search Report issued Oct. 2, 2014 in Patent Application No. 13181194.5
U.S. Appl. No. 13/771,465, filed Feb. 20, 2013.
U.S. Appl. No. 13/930,030, filed Jun. 28, 2013.
U.S. Appl. No. 13/909,340, filed Jun. 4, 2013.

(Continued)

*Primary Examiner* — Luke Ratcliffe
(74) *Attorney, Agent, or Firm* — Oblon, McClelland, Maier & Neustadt, L.L.P.

(57) ABSTRACT

A distance measurement apparatus that measures distance to a target by irradiating the target with laser beams and detecting light reflected by the target includes a light projection unit. The distance measurement apparatus also includes a plurality of light emission units to emit a plurality of laser beams onto the target while setting optical paths of the plurality of laser beams radially along a given virtual plane; and a light receiving unit including a plurality of light receivers to receive the plurality of laser beams projected from the light projection unit and reflected by the target.

16 Claims, 16 Drawing Sheets

(56) References Cited

FOREIGN PATENT DOCUMENTS

| | | |
|---|---|---|
| JP | 7-324911 | 12/1995 |
| JP | 2009-145107 | 7/2009 |
| WO | WO 02/082016 A1 | 10/2002 |

OTHER PUBLICATIONS

U.S. Appl. No. 13/920,401, filed Jun. 18, 2013.
Combined Chinese Office Action and Search Report issued Jul. 10, 2015 in Patent Application No. 201310309562.X (with English translation of categories of cited documents).

* cited by examiner

DISTANCE MEASUREMENT APPARATUS

CROSS-REFERENCE TO RELATED APPLICATION

This application claims priority pursuant to 35 U.S.C. §119 to Japanese Patent Application No. 2012-201054, filed on Sep. 13, 2012 in the Japan Patent Office, the disclosure of which is incorporated by reference herein in its entirety.

BACKGROUND

1. Technical Field

The present invention generally relates to a distance measurement apparatus, and more particularly to a distance measurement apparatus that irradiates a target with light, receives reflection light to measure a distance to the target.

2. Background Art

In conventional laser radar apparatuses such as that disclosed in JP-2009-145107-A, light emitted from a laser diode is radiated to a given area of an target via an oscillation mirror, which can oscillate about a first axis and a second axis perpendicular to the first axis, and a mirror unit having a plurality of mirrors having different inclination angles with respect to a third axis perpendicular to the first axis. Light reflected from the given area is received by a photodiode via the mirror unit to measure distance to a plurality of portions in the given area within a short time period.

However, the laser radar apparatus of JP-2009-145107-A has a complex configuration and control protocol, and is therefore costly.

SUMMARY

In one aspect of the present invention, a novel distance measurement apparatus to measure distance to a target by irradiating the target with laser beams and detecting light reflected by the target is devised. The distance measurement apparatus includes a light projection unit including a plurality of light emission units to emit a plurality of laser beams to the target while setting optical paths of the plurality of laser beams radially along a given virtual plane; and a light receiving unit including a plurality of light receivers to receive the plurality of laser beams projected from the light projection unit and reflected by the target.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
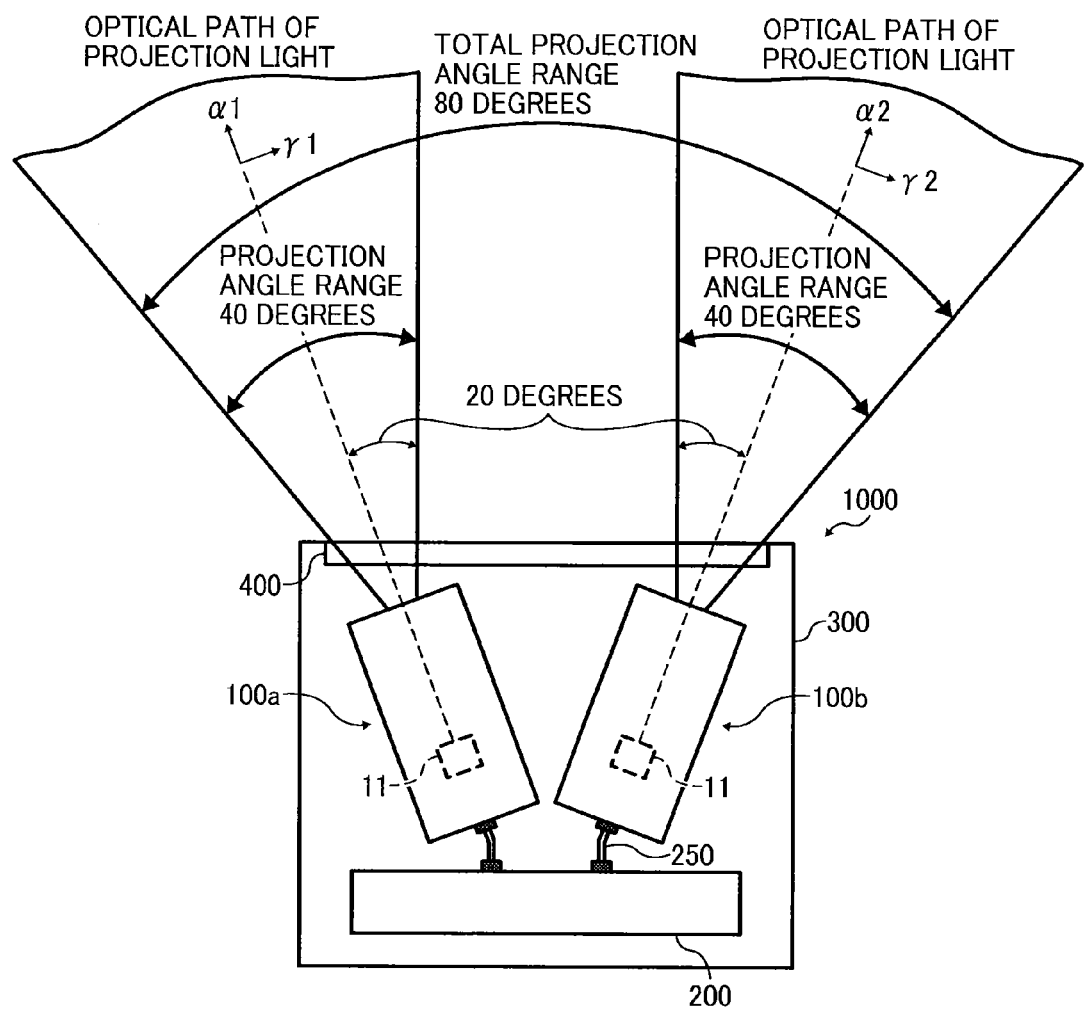
FIG. 1 shows a schematic configuration of a distance measurement apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that, have a similar function, operate in a similar manner, and achieve a similar result. Referring now to the drawings, apparatuses or systems according to example embodiment are described hereinafter.

A description is now given to an example embodiment with reference to FIGS. 1 to 5. FIG. 1 shows a schematic configuration of a distance measurement apparatus 1000 of according to an example embodiment.

The distance measurement apparatus 1000 is installed, for example, in vehicles. The distance measurement apparatus 1000 irradiates targets such as other vehicles (hereinafter, other vehicle) with light and receives the reflection light reflected from the targets to measure a distance to the targets such as other vehicles.

Further, the distance measurement apparatus can be disposed for still targets or moving targets other than vehicles, and further, the distance measurement apparatus can be used alone. Further, the target includes, for example, still targets and moving targets in addition to vehicles.

As shown in FIG. 1, the distance measurement apparatus 1000 includes, for example, two laser systems 100a/100b, a control circuit 200, and a casing 300 that encase these units. The casing 300 is, for example, a box member.

In this example case, XYZ three dimensional orthogonal coordinate system is set, in which a direction perpendicular to a moving direction of a vehicle equipped with the distance measurement apparatus 1000 (hereinafter, apparatus-equipped vehicle) is set as the Z-axis direction.

The two laser systems 100a and 100b have the same configuration substantially, and are disposed symmetrically with respect to the YZ plane. Hereinafter, the two laser systems 100a and 100b may be referred to as the laser system 100.

Figure 3:
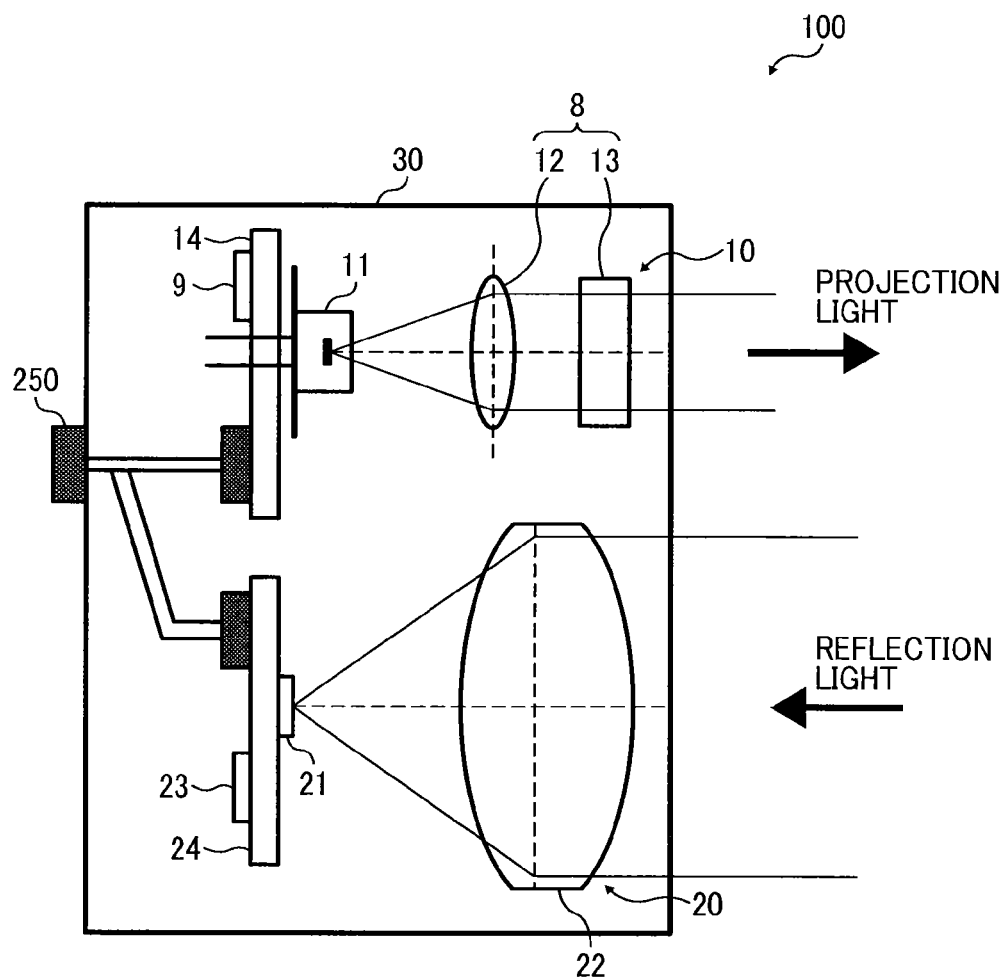
FIG. 3 shows a schematic configuration of a laser system of the distance measurement apparatus.

As shown in FIG. 3, the laser system 100 includes, for example, a light emission unit 10, a light receiver 20, and a holder 30 to hold the light emission unit 10 and the light receiver 20 integrally. The light emission unit 10 and the light receiver 20 are disposed with a given distance apart, for example, several millimeters (mm) to several centimeters (cm) in the Z-axis direction, which means disposed separately. For example, the light emission unit 10 is disposed at +Z side and the light receiver 20 is disposed at −Z side, but the position of the light emission units 10 and 20 can be changed.

The holder 30 is, for example, a box member of rectangular parallelepiped shape, which may have a longer side in one direction such as Z-axis direction. The holder 30 retains the light emission unit 10 and the light receiver 20 therein with the above described positional relationship.

The light emission unit 10 includes, for example, a laser diode (LD) 11 used as a light source, a LD drive circuit 9, which is a light source drive circuit, and a projection optical system 8 integrally.

A shown in FIG. 1, for example, each LD 11 is disposed on a circuit board 14 (see FIG. 3) while directing an light exit direction of each LD 11 to other vehicle positioned at +Y side of the apparatus-equipped vehicle. Specifically, the LD 11 at −X side has, for example, an exit direction ($\alpha$1-axis direction), parallel to the XY plane, which is angled 20 degrees to −X side from +Y direction, and the LD 11 at +X side has, for example, an exit direction ($\alpha$2-axis direction), parallel to the XY plane, which is angled 20 degrees to +X side from +Y direction, Therefore, the exit direction of the LD 11 at −X side and the exit direction of the LD 11 at +X side can define an angle of 40 degrees in the XY plane. In this example, a direction perpendicular to the $\alpha$1-axis direction in the XY plane is referred to as a gamma 1($\gamma$1)-axis direction, and a direction perpendicular to the $\alpha$2-axis direction in the XY plane is referred to as a gamma 2 ($\gamma$2)-axis direction. Further, if the LD 11 at +X side and the LD 11 at −X side are not considered as separate parts, the exit direction of LD 11 is referred to as the $\alpha$-axis direction, and a direction perpendicular to the $\alpha$-axis direction in the XY plane is referred to as the gamma ($\gamma$)-axis direction.

Figure 4:
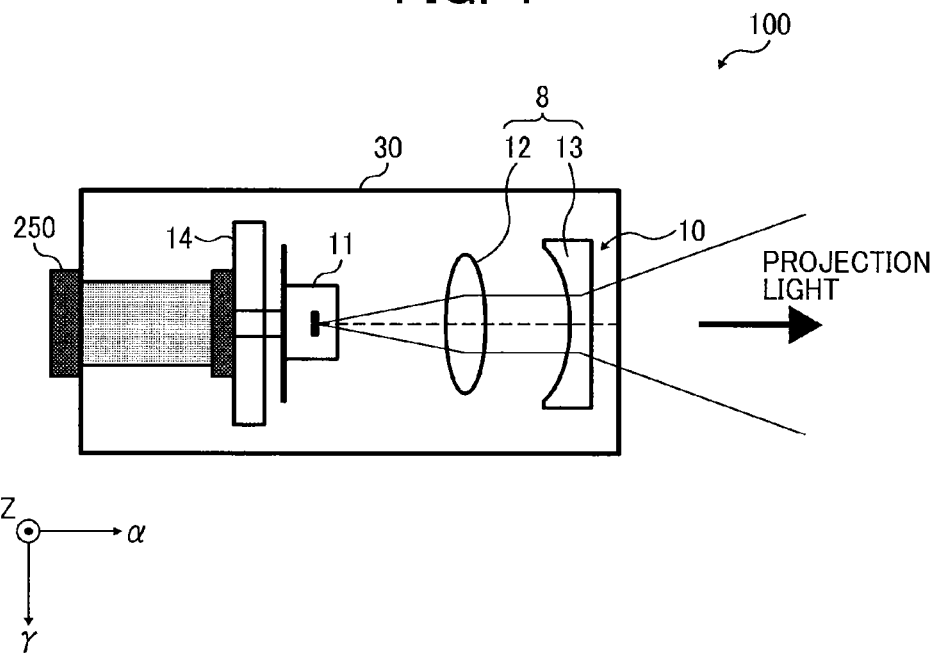
FIG. 4 shows a schematic configuration of the light emission unit of the laser system.
Figure 5:
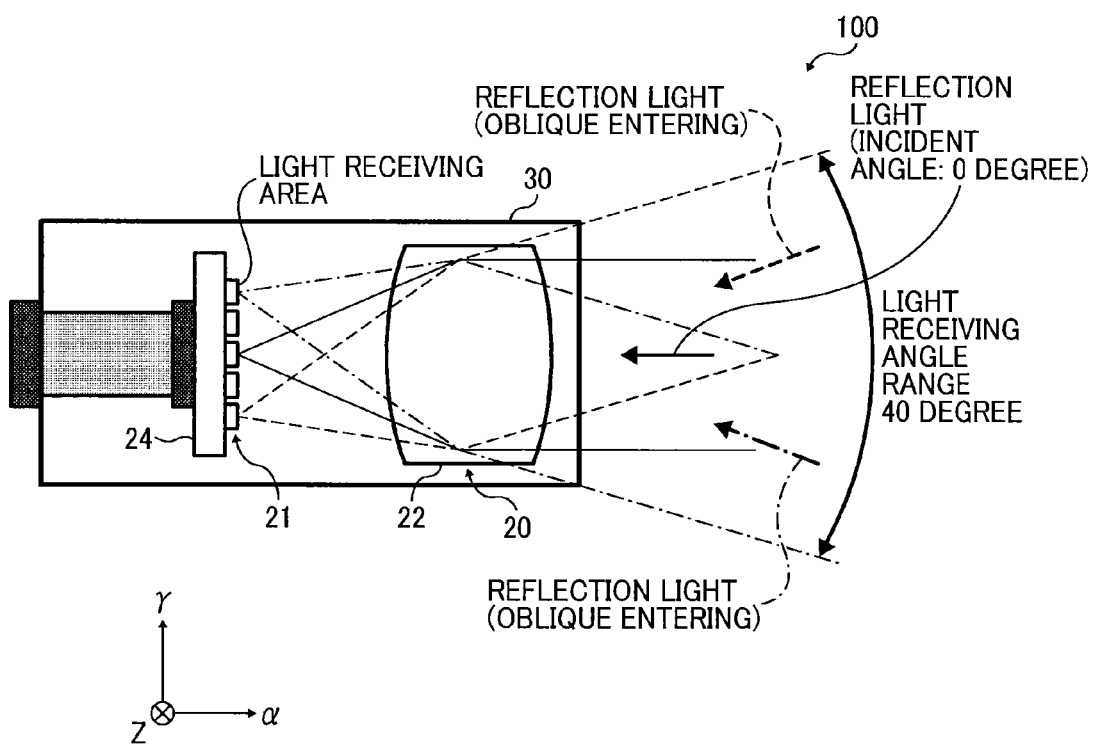
FIG. 5 shows a schematic configuration of the light receiving unit of the laser system.

Further, for example, laser beam emitted from each LD 11 has a given divergence angle along the $\alpha\gamma$ plane (XY plane) as shown in FIG. 4, and a given divergence angle along the $\alpha$Z plane as shown in FIG. 3. In FIGS. 3 to 5, $\gamma\alpha$Z three-dimensional orthogonal coordinate system is used.

The LD 11 is, for example, an edge emitting semiconductor laser having a base plate, and stacked-layers, wherein the stacked-layers are composed of stacking a plurality of semiconductor layers having an activation layer formed on the base plate. In the LD 11, the base plate is positioned in parallel to the XY plane, and as for a light emission area of the activation layer, a long side direction of rectangular cross-section is parallel to the XY plane, and a short side direction of rectangular cross-section is perpendicular to the XY plane.

For example, a width of the long side direction of rectangular cross-section of the light emission area is set from 100 μm to 300 μm, and a width of the short side direction of rectangular cross-section of the light emission area is set 10 μm or less.

As for the edge emitting semiconductor laser (LD), in a direction parallel to the base plate, the width of light emission area is broad, and can be operated with multi-mode, and light intensity profile in the light emission area becomes uniform.

To be described later, because a laser beam profile in a direction parallel to the XY plane (hereinafter, horizontal direction) of a laser beam irradiated to other vehicle is required to be uniform to enhance distance detection precision, the base plate of the LD 11 is positioned in parallel to the XY plane as described above.

As shown in FIG. 3, the LD drive circuit 9 is disposed on the circuit board 14, and supplies modulation current to the LD 11 to drive the LD 11 based on emission signal from a light emission control circuit 201, to be described later. Therefore, the LD 11 emits modulated light beam having a time-line waveform corresponding to current signals for a waveform supplied from the LD drive circuit 9.

The modulated light beam having waveform generated by the LD drive circuit 9 is, for example, a pulse wave used for normal distance measurement apparatus. For example, a drive signal is pulses having a pulse width of several nano seconds to several tens nano seconds, a peak intensity of about several tens Watt, and frequencies of several kHz to several tens kHz in time line are supplied to the LD 11. The LD 11 emits laser beams on and off based on the drive signal.

The LD drive circuit 9 is input with a light emission trigger signal and a given direct current voltage from the control circuit 200, to be described later, via a connector 250, and generates modulation signals to be output to the LD 11.

The projection optical system 8 includes, for example, a coupling lens 12 and a cylindrical lens 13 to shape laser beams emitted from the LD 11.

The coupling lens 12 is disposed on optical paths of laser beams emitted from the LD 11 to set the laser beams as substantially parallel light.

As shown in FIG. 4, the cylindrical lens 13 is disposed on optical paths of laser beams after the coupling lens 12 to diffuse the laser beams in the $\gamma$-axis direction (i.e., direction parallel to the XY plane). For example, the cylindrical lens 13 has an incidence face used as a refraction face having negative refractive power in the $\gamma$-axis direction. In this case, the cylindrical lens 13 is, for example, curved so that the $\alpha\gamma$ cross-section of the incidence face of the cylindrical lens 13 becomes convex at +α side. Further, the optical axis of the cylindrical lens 13 is aligned to the optical axis of the coupling lens 12.

In this case, the long side direction of rectangular cross-section light emission area of the LD 11 and a direction of the cylindrical lens 13 having the power are matched. With this configuration, a divergence angle of laser beams emitted from the light emission unit 10 along the αγ plane (XY plane) can be further enlarged, and the light intensity can be set uniform within the divergence angle range. If the light intensity can be set uniform within the divergence angle range along the αγ plane, distance measurement precision for each divided area can be preferably set uniform when the distance detection angle range is divided in the horizontal direction.

Laser beams emitted from the cylindrical lens 13, which means the laser beams emitted from the light emission unit 10 can be projected outside the holder 30 through a window disposed on at a +α-side wall of the holder 30, and then can be projected outside the casing 300 via a light-permeable window member 400, made of translucent glass (or translucent plastic), attached on an opening formed on the +Y-side wall of the casing 300. Therefore, the laser beam projected from the light-permeable window member 400 is the laser beam projected from the distance measurement apparatus 1000. Further, the light-permeable window member 400 can be set with a function of a band-pass filter to prevent entering of ambient light into the casing 300.

The two light emission units 10 configures a light projection unit that projects two laser beams having optical paths arranged radially along the XY plane.

The two laser beams having optical paths along the XY plane means the optical paths of the two laser beams along the XY plane are separated, close (including contacting), or overlapped slightly.

Further, for example, the exit direction of the two laser beams are angled for 40 degrees in the XY plane each other, and each of the two laser beams has the divergence angle of 40 degrees along the XY plane. Further, for example, each of the two laser beams has a divergence angle of 10 degrees along the αZ plane.

With this configuration, the distance measurement apparatus 1000 can project laser beams toward other vehicle positioned at +Y side of the apparatus-equipped vehicle in an angle range of 80 degrees along the XY plane entirely, and a maximum angle range of 10 degrees along a plane perpendicular to the XY plane (Z-axis direction).

The laser beam projected to other vehicle from the each light emission unit 10 in the light projection unit (hereinafter, projection light) is reflected at other vehicle, and a part of the reflection light returns along the same optical path of projection light, and enters the light receiver 20. Further, the +α-side wall of the holder 30 has a window to pass through the reflection light to the light receiver 20.

As shown in FIG. 5, the light receiver 20 includes, for example, a photodiode (PD) 21 used as a light receiving element, a condensing lens 22 used as a light condensing system, and a signal amplification circuit 23 (see FIG. 3) as one integrated unit.

The PD 21 has, for example, a light receiving face including a plurality of light receiving areas arranged along the γ-axis direction. The PD 21 is equipped to a circuit board 24 while setting the light receiving face perpendicular to the exit direction (α-axis direction) of the exit direction of LD 11.

The condensing lens 22 is disposed on optical paths of laser beams projected from the light emission unit 10 of the laser system 100 and reflected at other vehicle to focus the laser beams to any one of the light receiving areas of the PD 21.

For example, the condensing lens 22 has a shape that a size in the Z-axis direction is long and a size in the γ-axis direction is short, which means a shape having a greater aspect ratio is used.

Each of the two light receivers 20 is used as a light receiving unit to receive the laser beam emitted from the light projection unit and reflected at other vehicle.

Further, the light emission unit 10 and the light receiver 20 in each of the laser systems 100 are disposed close to each other in the Z-axis direction as described above. For example, the optical axis of the projection optical system 8 and the optical axis of the condensing lens 22 can be assumed on the same axis when viewed from a position distanced for several meters or more.

The PD 21 converts light signals received at each of light receiving areas to electrical signals, and outputs the electrical signals to the signal amplification circuit 23.

The signal amplification circuit 23 amplifies the electrical signals input from the PD 21, and outputs the amplified electrical signals to a comparator 203 to be described later.

As for the above described laser system 100, the laser beam emitted from the LD 11 is projected outside the casing 300 via the projection optical system 8, and then irradiated to other vehicle.

The laser beams emitted from the LD 11 radiate into the horizontal direction (γ-axis direction) and the vertical direction (Z-axis direction) with a given divergence angle and enters the coupling lens 12, and the coupling lens 12 sets the laser beams to substantially parallel light.

In this case, the divergence angle of projection light along the αZ plane can be determined based on a width of rectangular cross-section of light emission area of the LD 11 in the Z-axis direction and a focal length of the coupling lens 12, and this divergence angle defines a projection angle range along the αZ plane.

Further, the cylindrical lens 13 having negative refractive power in the γ-axis direction is disposed after the coupling lens 12 (+α side), with which only the divergence angle along the γα plane can be set further greater, in which the projection light is broader in the direction parallel to the XY plane.

Further, the long side direction (γ-axis direction) of rectangular cross-section of light emission area of the LD 11 and the direction (γ-axis direction) that the cylindrical lens 13 has negative refractive power can be matched. In this case, the divergence angle of projection light in the γ-axis direction can be easily set greater, and the light intensity of projection light within the projection angle range along the αγ plane can be set uniform. If the light intensity of projection light can be set uniform within the projection angle range, distance measurement precision for each divided area can be preferably set uniform when the projection angle range is divided.

The laser beam reflected at other vehicle scatters at the reflection position (incidence position) to random directions (i.e., reflect diffusely), and only the laser beam (reflection light) coming back the same optical path of projection light can be guided to the PD 21 via the condensing lens 22.

The projection angle range of laser beams of the laser system in the horizontal direction (X-axis direction) and the vertical direction (Z-axis direction) is defined by the divergence angle of projection light in the horizontal direction and the vertical direction. Because the divergence angle depends on the long side direction width and the short side direction width of a rectangular cross-section of light emission area of LD, and a focal length of the projection optical system in the horizontal direction and the vertical direction, by adjusting each value, the laser beam having a desired divergence angle can be projected.

A part of the light reflected from other vehicle coming back along the same optical path that the projection light takes, and the reflection light condensed to the condensing lens 22 has a divergence angle which is the same level of divergence angle of projection light in the horizontal direction and the vertical direction. In this case, the reflection light passing through the condensing lens 22 enters the PD 21 while shifted to the γ-axis direction and the Z-axis direction from the optical axis of the condensing lens 22 depending on the incidence angle to the condensing lens 22 (see FIG. 5).

In view of such shifting, a plurality of light receiving areas is arranged in the γ-axis direction (horizontal direction) in the PD 21, which means that the light receiving face is divided in the γ-axis direction. With this configuration, information (hereinafter, distance computing information) for computing distance to a plurality of positions on a surface of other vehicle in the X-axis direction (horizontal direction) can be obtained one by one.

Further, by adjusting a size of the entire light receiving face of the PD 21 in the γ-axis direction and a focal length of the condensing lens 22, the light receiving angle range in the γ-axis direction can be set. By setting the light receiving angle range same as the above projection angle range in the γ-axis direction, and dividing the light receiving face of the PD 21 into a plurality of light receiving areas arranged in the γ-axis direction and detecting light signal received by each area, the light receiving angle range can be divided.

For example, in FIG. 5, the light receiving face of the PD 21 is divided into five areas in the horizontal direction. The reflection light entering parallel to the optical axis of the condensing lens 22 enters the center light receiving area in the γ-axis direction via the condensing lens 22 (see a solid line in FIG. 5). Further, the reflection light entering from a direction (oblique entering) crossing the optical axis of the condensing lens 22 (most +γ side of light receiving angle range) enters the most −γ side of the light receiving areas via the condensing lens 22 (see a broken line of FIG. 5). Further, the reflection light entering from a direction (oblique entering) crossing the optical axis of the condensing lens 22 (most −γ side of light receiving angle range) enters the most +γ side of the light receiving areas via the condensing lens 22 (see an alternate long and short dash line of FIG. 5).

Referring back to FIG. 1, the control circuit 200 is disposed at −Y side of the two laser systems 100a and 100b in the casing 300.

Figure 2:
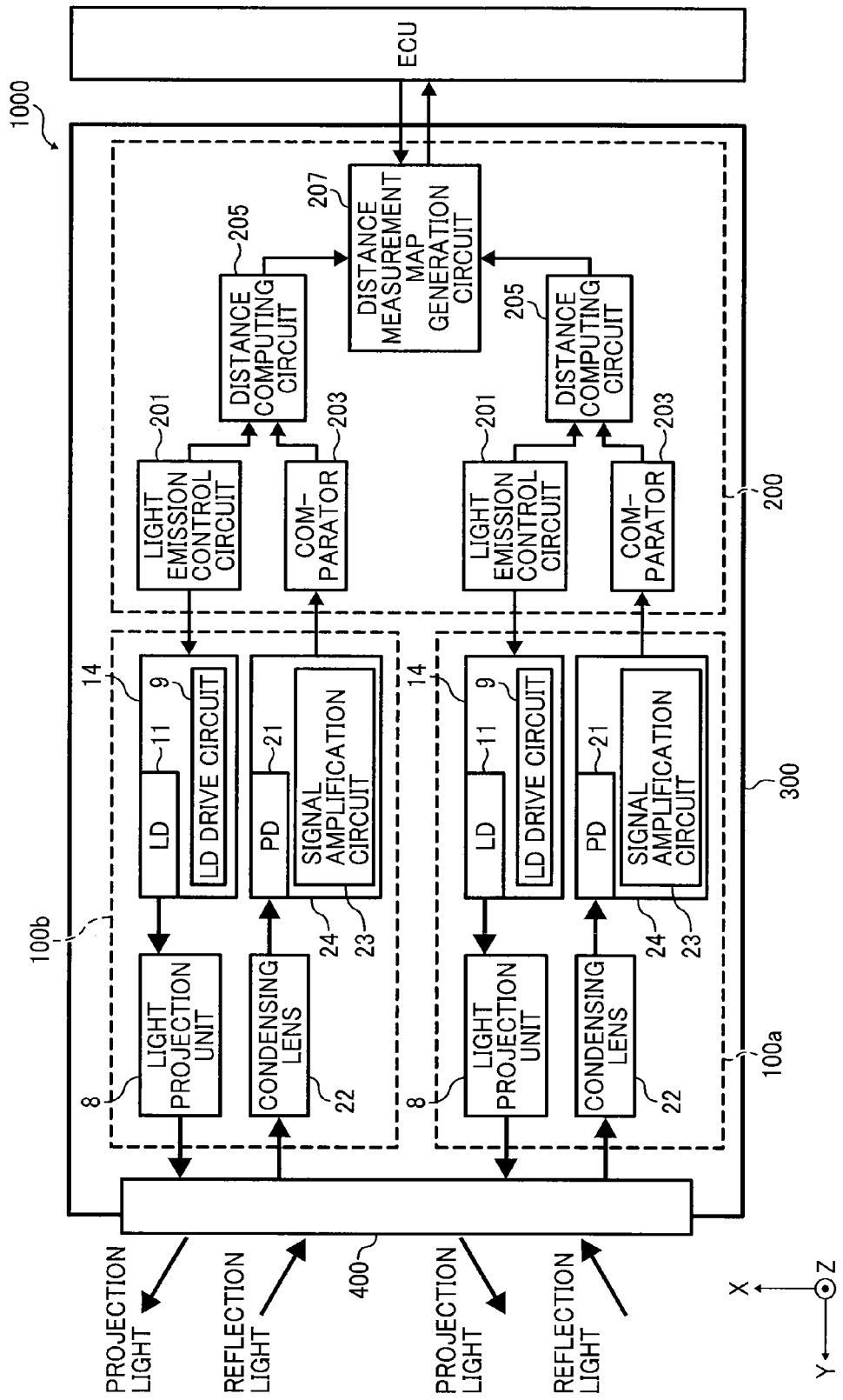
FIG. 2 is a block diagram of the distance measurement apparatus.

As shown in FIG. 2, the control circuit 200 includes, for example, a distance measurement map generation circuit 207, two light emission control circuits 201, two comparators 203, and two distance computing circuits 205 disposed for each of the two laser systems 100

The control circuit 200 converts time difference between the emission timing of the LD 11 and light receiving timing at each of the light receiving areas input from the signal amplification circuit 23 to distance information.

The distance measurement map generation circuit 207 generate map information by collecting distance information of each of the light receiving areas, and transmits map information to an electronic control unit (ECU) for vehicle control disposed at −Y side of the distance measurement apparatus 1000.

The light emission control circuit 201 outputs an emission signal to the LD drive circuit 9 at a given timing to control the emission timing of the LD 11.

The comparator 203 compares the received light signal, output from each of the light receiving areas of the PD 21 via the signal amplification circuit 23, with a given reference level, and outputs a comparison result to the distance computing circuit 205.

The distance computing circuit 205 computes distance to other vehicle based on the emission timing and the peak timing (light receiving timing) of received light signal. When the distance measurement is conducted by dividing the light receiving face of the PD 21 into a plurality of light receiving areas, the distance measurement map generation circuit 207 integrates distance information corresponding to each of the light receiving areas, and transmits the integrated distance information to the vehicle-control ECU for each sampling time unit.

Further, as described above, when the projection light projected from the laser system 100 irradiates other vehicle, among the reflection light, only light component coming back along the same optical path that the projection light takes can be received by the PD 21. The reflection light received by the PD 21 is converted to electrical signal, amplified by the signal amplification circuit 23, and transmitted to the control circuit 200 via the connector 250.

Because the distance from the distance measurement apparatus 1000 to other vehicle is too great compared to the distance between the LD 11 and the PD 21 in each of the laser systems 100, the optical path of projection light and the optical path of reflection light can be assumed the same optical path in the laser system 100.

The laser beam (reflection light) coming back to the laser system 100 can be condensed by the condensing lens 22 in the horizontal direction and the vertical direction, and then enters the PD 21. The light receiving angle range in the horizontal direction and the vertical direction can be set based on a size of the light receiving face of the PD 21 and a focal length of the condensing lens 22. By setting the light receiving angle range substantially the same as the projection angle range of projection light, a noise signal occurrence caused by intrusion of ambient light to the PD 21 can be suppressed, with which distance measurement can be conducted with high precision.

Further, to secure the light receiving angle range extending in the horizontal direction, the light receiving face shape of the PD 21 has a long shape in the horizontal direction (γ-axis direction). The light receiving angle range in the γ-axis direction can be determined based on a total width of the light receiving face of the PD 21 in the γ-axis direction and the focal length of the condensing lens 22. The total width of the light receiving face of the PD 21 in the γ-axis direction and the focal length of the condensing lens 22 are set so that the light receiving angle range in the γ-axis direction becomes substantially equal to the projection angle range in the γ-axis direction. For example, when the total width of the light receiving face of the PD 21 in the γ-axis direction is 12.7 mm, and the focal length of the condensing lens 22 is 17 mm, the light receiving angle range in the γ-axis direction becomes 40 degrees, with which the light receiving angle range having a greater angle can be obtained.

Further, as described above, as shown in FIG. 5, it is effective to divide the PD 21 in the horizontal direction (γ-axis direction), in which the light receiving angle range extending in the horizontal direction is divided in a plurality of the light receiving angle range, with which the distance measurement can be conducted for each divided area having an angle range smaller than the light receiving angle range by obtaining distance computing information by processing each reflection light entering each of the light receiving areas of the PD 21.

For example, when the light receiving angle range in the horizontal direction is set 40 degrees, and 16 light receiving areas are arranged in the horizontal direction, the angle resolution level becomes 2.5 degrees, which is small, in which other vehicle can be recognized easily compared to without dividing area. Further, because an area of the light receiving face for each of the light receiving areas becomes small, the response speed of PD can be enhanced. With this configuration, time measurement can be conducted with high precision, and distance measurement precision can be enhanced.

The above described distance measurement apparatus 1000 includes, for example, a light projection unit and a light receiving unit. The light projection unit projects a plurality of laser beams such as two laser beams to other vehicle (target), wherein optical paths are arranged radially along the XY plane, which is a given virtual plane. The light receiving unit receives a plurality of laser beams such as two laser beams projected from the light projection unit and reflected by other vehicle.

In this case, the light projection unit can project a plurality of laser beams radially while optical paths of each of a plurality of laser beams such as two laser beams are not superimposed substantially along the XY plane, with which the light projection unit can be compact in size while securing a greater projection angle range along the XY plane depending on the number of laser beams and the divergence angle (projection angle range) of each laser beam along the XY plane can be obtained.

With this configuration, for example, without a moveable part such as a deflection mirror to scan other vehicle using laser beams, which means without increasing cost, the laser beams can be irradiated to a given area of one axis direction (e.g., X-axis direction) of other vehicle, and distance to a plurality of portions in the given area can be measured within a short time period. Further, because the moveable part is not disposed, the configuration and control becomes simple, vibration occurrence can be suppressed, and reliability becomes high.

Further, two laser beams projected from the light projection unit have a given divergence angle (e.g., 40 degrees) along the XY plane.

In this case, by using the two laser beams, the projection angle range having a greater angle along the XY plane (e.g., 80 degrees) can be obtained.

Further, because the two laser systems 100a and 100b have the same configuration substantially, for example, parts and assembly process can be the same, and it can reduce the manufacturing cost.

Further, in the laser system 100, the holder 30, made of a member having rectangular parallelepiped shape, encases the light emission unit 10 and the light receiver 20 while the light emission unit 10 and the light receiver 20 are positioned close in the Z-axis direction. Further, because the two laser systems 100 are arranged in the X-axis direction in the distance measurement apparatus 1000, the apparatus can be compact in size.

Further, because each of the laser systems 100 can be controlled by the respective control circuit 200, time information (i.e., difference between the emission timing and light receiving timing) detected by each of the laser systems 100 can be obtained substantially at the same time, and distance can be computed based on the obtained time information.

Further, because the two laser systems 100a and 100b can be arranged by setting two optical paths arranged radially along the XY plane, by increasing the number of the laser systems 100, a total projection angle range of the distance measurement apparatus 1000 can be enlarged. To arrange the optical paths of a plurality of laser beams along the XY plane, the installation angles of the plurality (e.g., two) of the laser systems 100 in the casing 300 are differentiated with each other (see FIG. 1) as above described example embodiment, which is a simple method.

Further, even when increasing the number of the laser systems 100, distance information for distance detection angle range (a narrower one of the projection angle range and the light receiving angle range) processed by each of the laser systems 100 can be integrated and distance measurement map can be generated.

Further, in the control circuit unit, the emission control circuit and then comparator can be integrated as one unit, and connection to the light source drive circuit and signal amplification circuit in each of the laser systems can be switched using a switch. By switching the distance detection angle range for each time, the number of parts of the control circuit unit can be reduced, and further cost reduction can be achieved.

A description is given of variant examples of the above described example embodiment with reference to FIGS. 6 to 18. In the following variant examples, differences with respect to the above described example embodiment are discussed, and thereby the same or similar parts of the above described example embodiment are attached with the same references and the explanation is omitted.

(First Variant Example)

Figure 6:
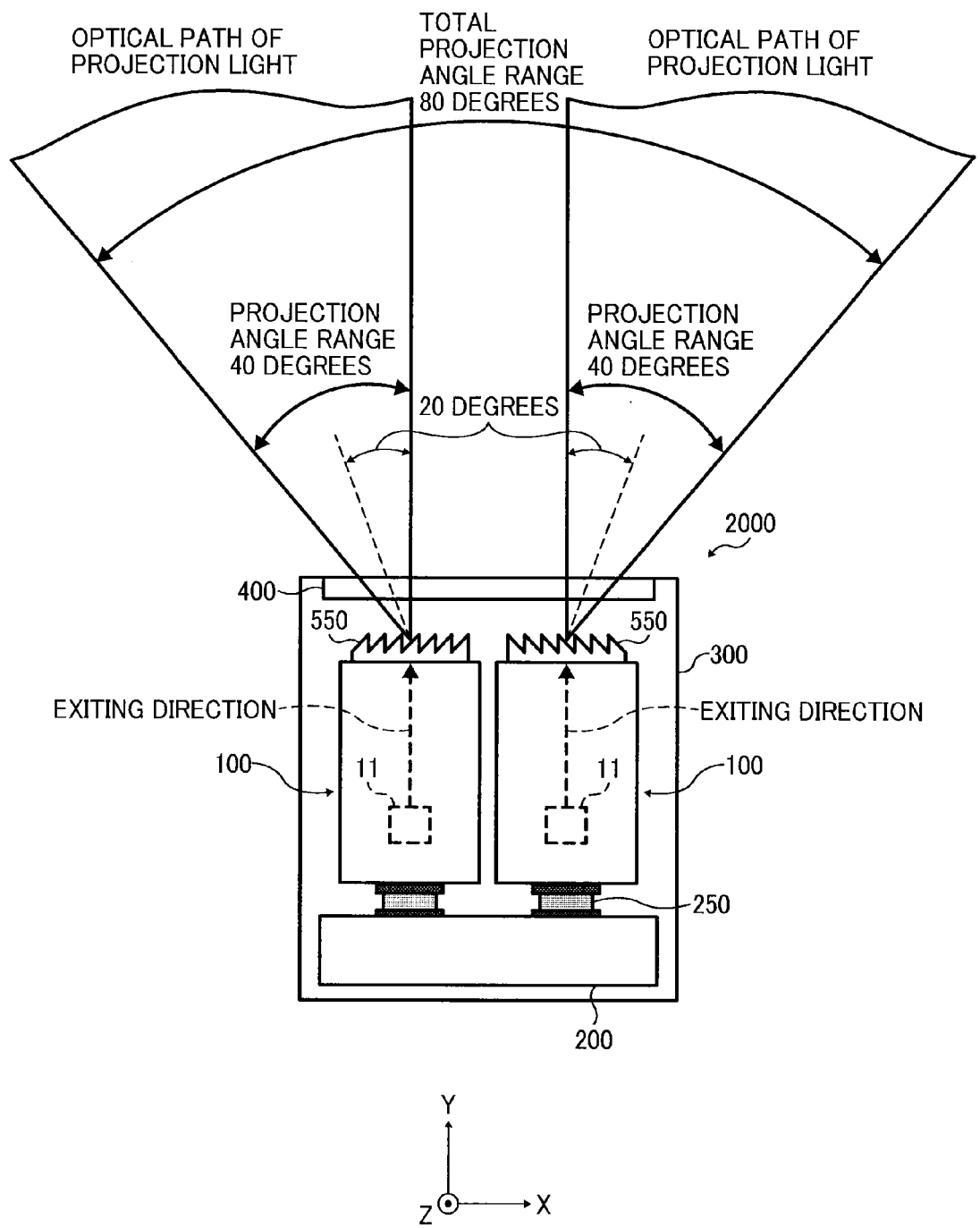
FIG. 6 shows a schematic configuration of a distance measurement apparatus of a first variant example.

Compared to the above described example embodiment, in the first variant example, as shown in FIG. 6, an arrangement of the laser two emission/reception units 100 is differentiated, and a deflector such as a deflection plate 550 is disposed at +Y side of the light emission unit 10 and the light receiver 20 of each of the laser systems 100.

In a distance measurement apparatus 2000 of the first variant example, the two laser systems 100 are installed in the casing 300 with the same installation angle. Specifically, as for each of the two laser systems 100, the exit direction of the light emission unit 10 (exit direction of LD 11) is set to +Y direction.

Further, the deflection plate 550 is disposed at +Y side of the light emission unit 10 and the light receiver 20 of each of the laser systems 100. In this configuration, the laser beam (projection light) projected from the light emission unit 10 is deflected at the deflection plate 550, passes through the light-permeable window member 400, and strike or enter other vehicle.

Specifically, the laser beam projected from the laser system 100 at −X side toward +Y direction is deflected by the deflection plate 550 for 20 degrees to −X side with respect to +Y direction in the XY plane, and strikes or enters other vehicle. Further, the laser beam projected from the laser system 100 at +X side toward +Y direction is deflected by the deflection plate 550 for 20 degrees to +X side with respect to +Y direction in the XY plane, and enters other vehicle. Further, the divergence angle (projection angle range) of projection light is set, for example, 40 degrees, and a total projection angle range becomes 80 degrees, which means that the optical paths of two projection lights each having the divergence angle of 40 degrees are arranged radially along the XY plane. Further, the two deflection plates 550 have the substantially same configuration except a symmetrical arrangement with respect to the YZ plane.

Further, a part of the reflection light from other vehicle comes back along the same optical path that the incident light (projection light) takes, and is deflected by the deflection plate 550 to −Y direction, and received by the light receiver 20.

The deflection plate 550 can be prepared by forming a prism at least one of an incidence face and an exit face.

Figure 14:
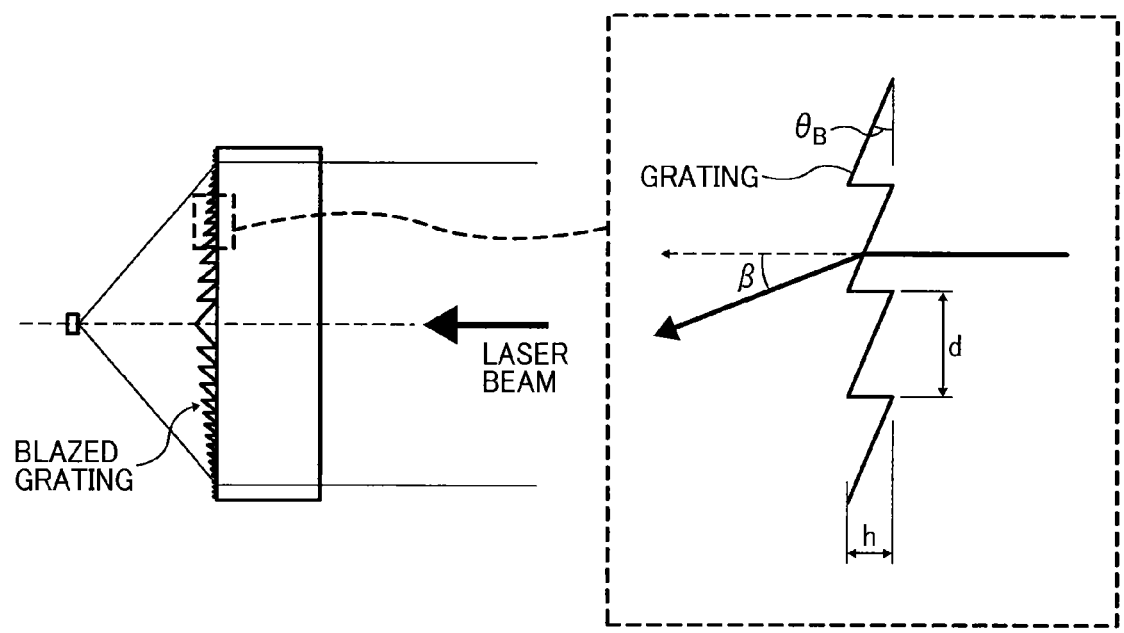
FIG. 14 shows a schematic configuration of a blazed grating.

Further, the deflection plate 550 can be effectively prepared by forming a blazed grating shown in FIG. 14 at least one of an incidence face and an exit face.

As for the blazed grating, a grating pitch d to obtain a diffraction angle β can be computed by following formula (1).

$$d = \frac{m\lambda}{\sin\beta} \quad (1)$$

In formula (1), λ is wavelength, and m is diffraction degree. Further, a grating height h can be computed by following (2).

$$h = \frac{Nm\lambda}{n - \sqrt{1 - (Nm\lambda)^2}} d \quad (2)$$

In formula (2), n is refractive index of material of the deflection plate 550, and N is the number of grating per unit length (N=1/d).

For example, when the distance measurement apparatus uses the laser beam having a wavelength of 905 nm, and material having refractive index "n" of 1.52, the grating pitch d is set 1.41 μm, and the grating height h is set 1.20 μm so that the deflection angle (diffraction angle) of 40 degrees by primary diffraction light is obtained.

By setting the grating pitch d and the grating height h, the deflection plate 550 that can diffract the laser beam with a desired diffraction angle can be prepared. Further, because the blazed grating capability does not depend on plate thickness, compared to using a prism, the deflection plate can be prepared thinner, with which the apparatus can be further compact in size.

Compared to the above described example embodiment, in the first variant example, the two laser systems 100 can be disposed further closer, with which the apparatus can be compact in size.

(Second Variant Example)

Figure 7:
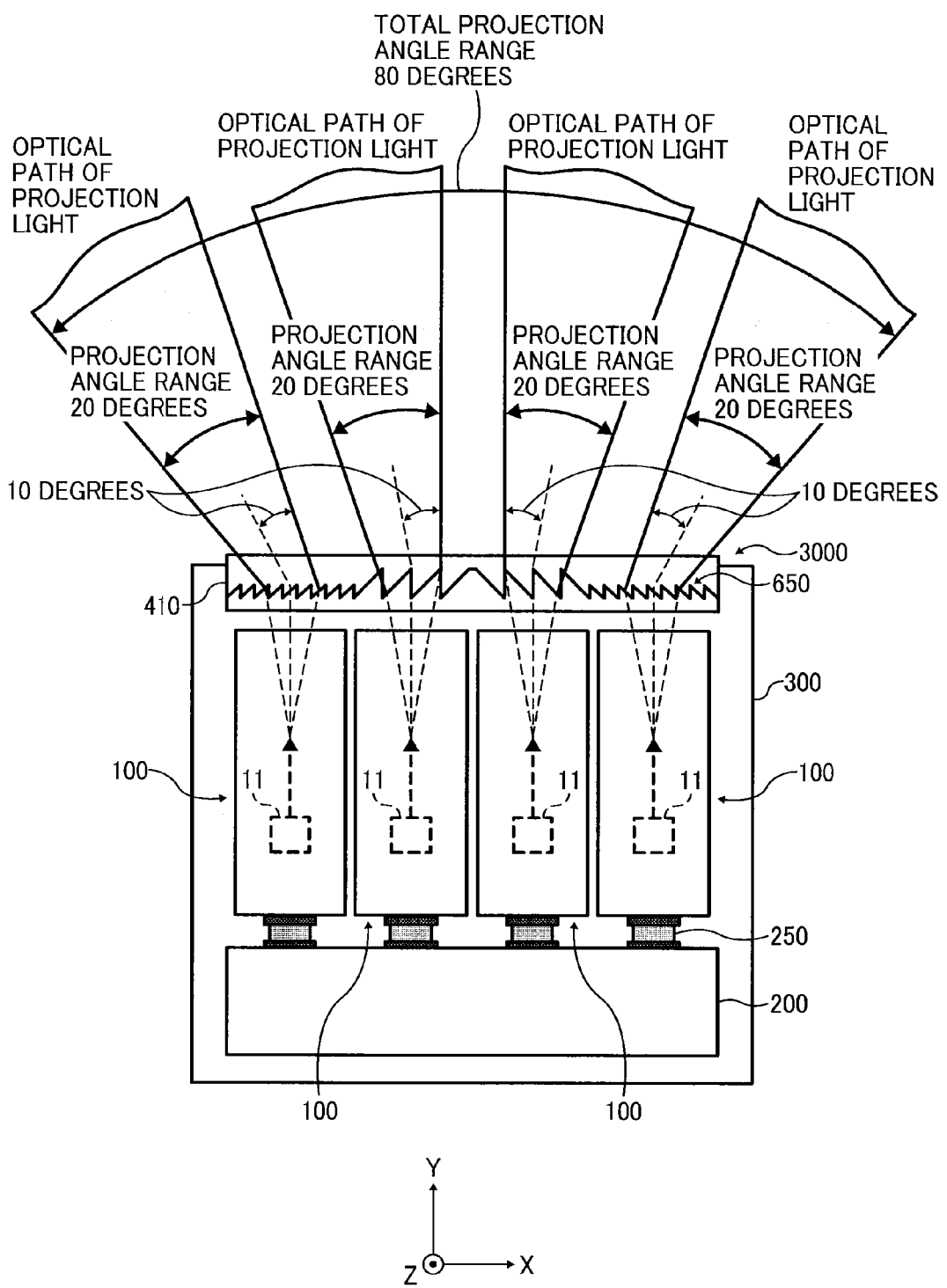
FIG. 7 shows a schematic configuration of a distance measurement apparatus of a second variant example.

Compared to the above described example embodiment and the first variant example, in the second variant example, as shown in FIG. 7, the number of the laser systems 100 is differentiated, and a light-permeable window member 410 having a function to deflect laser beams is provided.

In a distance measurement apparatus 3000 of the second variant example, four laser systems 100 are arranged in the casing 300 along the X-axis direction while setting the exit direction (exit direction of LD 11) to +Y direction.

The light-permeable window member 410 is formed with a blazed grating 650. In this configuration, the laser beam projected from each of the laser systems 100 is deflected at the blazed grating 650, and strikes or enters other vehicle.

Specifically, the laser beam projected from the laser system 100 at the most −X side to +Y direction is deflected by the blazed grating 650 for 30 degrees to −X side with respect to +Y direction in the XY plane, and enters other vehicle. Further, among the two laser systems 100 positioned at the center of the X-axis direction, the laser beam projected from the laser system 100 at the −X side to +Y direction is deflected by the blazed grating 650 for 10 degrees to −X side with respect to +Y direction in the XY plane, and enters other vehicle, and the laser beam projected from the laser system 100 at the +X side to +Y direction is deflected by the blazed grating 650 for 10 degrees to +X side with respect to +Y direction in the XY plane, and enters other vehicle. Further, the laser beam projected from the laser system 100 at the most +X side to +Y direction is deflected by the blazed grating 650 for 30 degrees to +X side with respect to +Y direction in the XY plane, and enters other vehicle.

Further, the divergence angle (projection angle range) of projection light is set, for example, 20 degrees, and a total projection angle range becomes 80 degrees. Therefore, the optical paths of four projection lights, each having the divergence angle of 20 degrees, are arranged radially along the XY plane.

As for the blazed grating 650, a symmetrical shape with respect to the YZ plane is employed, and the grating pitch d and the grating height h are set so that the diffraction angle (e.g., 10 degrees) corresponding to the two laser systems 100 at the center of the X-axis direction becomes small, and the diffraction angle (e.g., 30 degrees) corresponding to the two laser systems 100 at both ends of the X-axis direction becomes great.

In the second variant example, for example, the blazed grating having different grating shapes in the X-axis direction is formed on an optical glass or a plastic plate, and a translucent member covers the blazed grating to prepare the light-permeable window member 410. Further, the translucent member can be omitted.

Further, in the second variant example, the light receiving angle range of light receiving unit is set, for example, 20 degrees which is the same for the projection angle range.

In the second variant example, by adding the function of deflecting the laser beam to the light-permeable window member 410, the number of parts and the number of assembly stages of apparatus can be reduced, and can reduce the manufacturing cost of apparatus compared to the first variant example.

(Third Variant Example)

Figure 8:
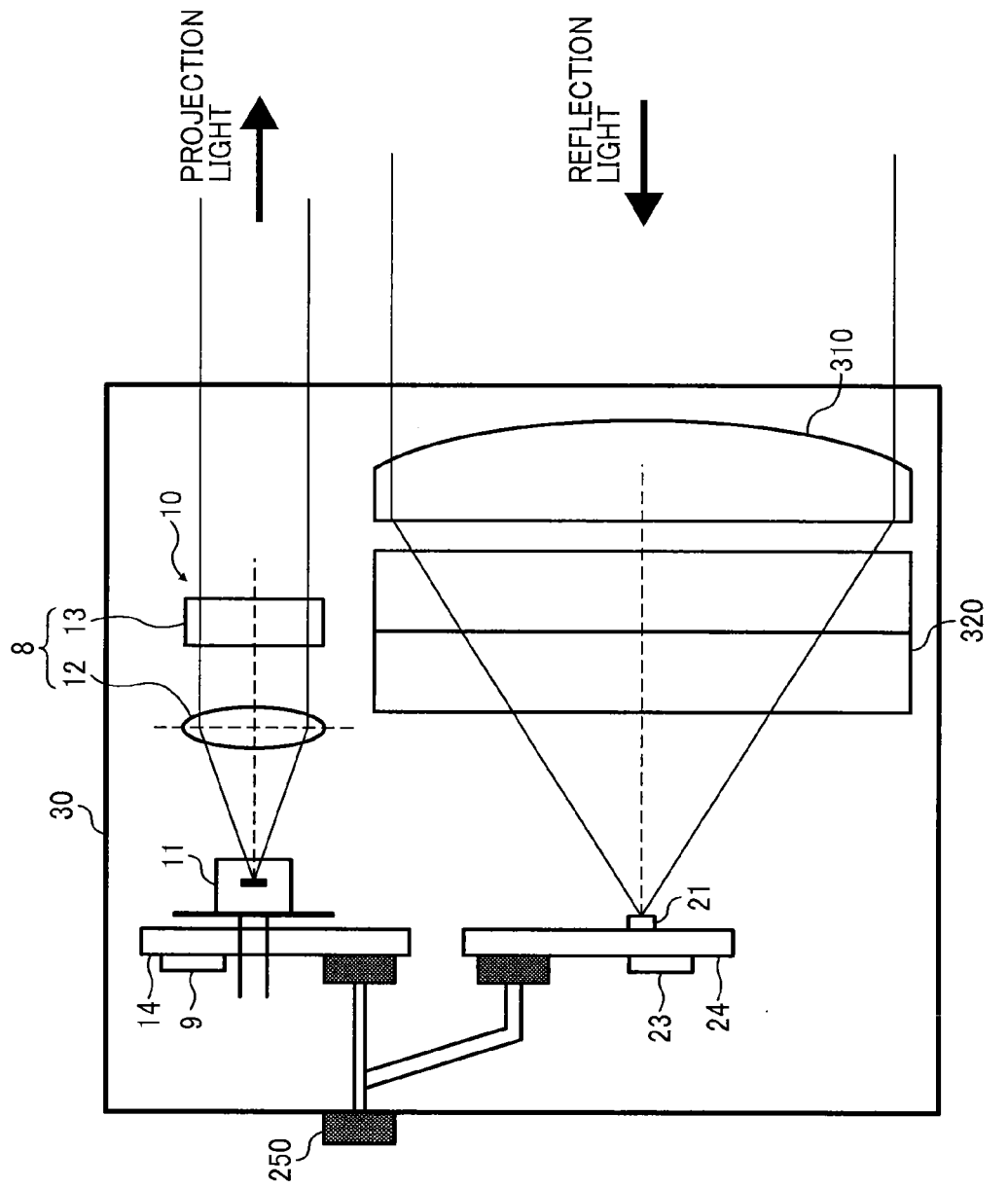
FIG. 8 shows a schematic configuration of a light receiving unit of one type of a third variant example.
Figure 9:
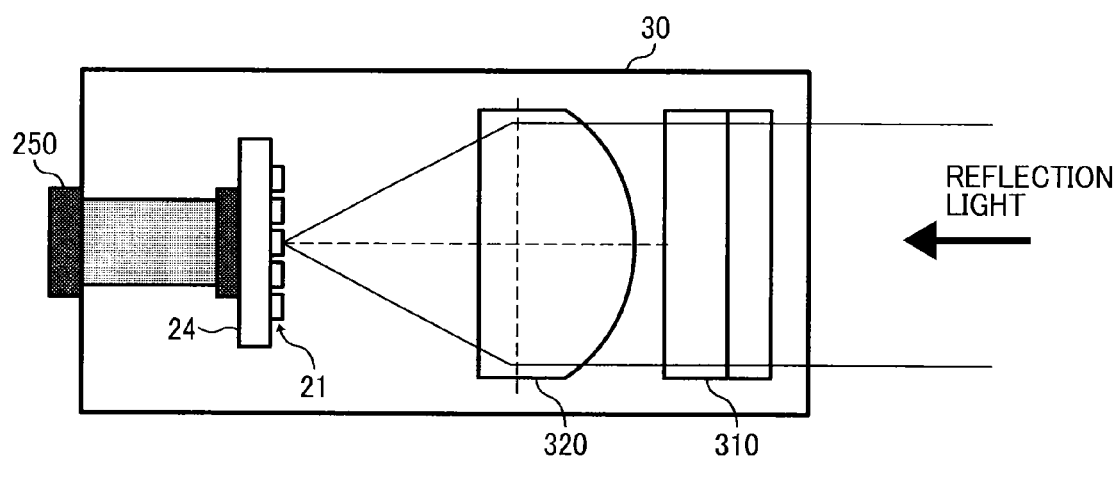
FIG. 9 shows a schematic configuration of a light receiving unit of another type of a third variant example.

Compared to the above described example embodiment, in the third variant example, as shown in FIGS. 8 and 9, a configuration of light receiving unit of each of the laser systems is differentiated.

In the third variant example, the light condensing system of light receiving unit is configured with two cylindrical lenses 310 and 320.

In the distance measurement of the above described example embodiment and each variant example, a plurality of laser systems are arranged in the X-axis direction. To make the apparatus compact in size, a width of the laser system in the γ-axis direction is preferably set smaller whereas to make the distance detection angle range greater, an area of condensing lens configuring the light condensing system is preferably set greater.

To satisfy these requirements, in the above described example embodiment and each variant example (including the third variant example), the size of the holding member and the size of the condensing lens encased in the holding member has a greater size in the Z-axis direction, and a smaller size in the γ-axis direction, which means a shape having a greater aspect ratio is used.

Further, to make the distance measurement apparatus compact in size, a size of the laser system in the depth direction (α-axis direction) is required to be small. Therefore, the shorter the focal length of the light condensing system is better.

The light receiving angle range is required to be a wider angle only in the horizontal direction (γ-axis direction) whereas the light receiving angle range in the vertical direction (Z-axis direction) is set to an angle corresponding to the divergence angle of projection light in the vertical direction (Z-axis direction).

Specifically, the horizontal direction requires the light receiving angle range of, for example, from 10 degrees to 50 degrees, but the vertical direction requires the light receiving angle range of several degrees. As for the properties of the light condensing system, the light in the horizontal direction requires to be condensed with a short focus, but the focal length in the vertical direction can be set relatively long.

In the third variant example, the light condensing system is configured with, for example, two cylindrical lenses arranged in the α-axis direction, and the reflection light from other vehicle is separately condensed in the horizontal direction and the vertical direction. Specifically, the reflection light from other vehicle is condensed in the vertical direction by the first cylindrical lens 310 disposed at +α side, and the reflection light from other vehicle is condensed in the horizontal direction by the second cylindrical lens 320 disposed at −α side, and then the reflection light is guided to the PD 21.

In this configuration, the first cylindrical lens 310 is curved so that the αZ cross-section is convexed to +α side, and the incidence face has positive refractive power in the Z-axis direction (see FIG. 8), and the second cylindrical lens 320 is curved so that the αγ cross-section is convexed to +α side, and the incidence face has positive refractive power in the γ-axis direction (see FIG. 9).

Because the short focus condensing becomes difficult as the lens size becomes greater, the reflection light is condensed in the vertical direction using the first cylindrical lens 310 at +α side (far from PD 21) having a greater lens width in the vertical direction. The lens width in the horizontal direction becomes relatively small, with which short focus condensing of lens is relatively easy compared to the vertical direction. Therefore, the reflection light is condensed in the horizontal direction using the second cylindrical lens 320 at −α side (near to PD 21) having a smaller lens width in the horizontal direction.

In the third variant example, by configuring the light condensing system with the two cylindrical lenses 310 and 320, compared to the above described example embodiment and each variant example, a size of the laser system in the γ-axis direction and the α-axis direction can be smaller, with which the apparatus can be compact in size.

Further, a positional relationship of the two cylindrical lenses 310 and 320 can be inverted in the third variant example.

Further, the exit face of the first and second cylindrical lenses can be formed as a cylindrical face.

(Fourth Variant Example)

Figure 10:
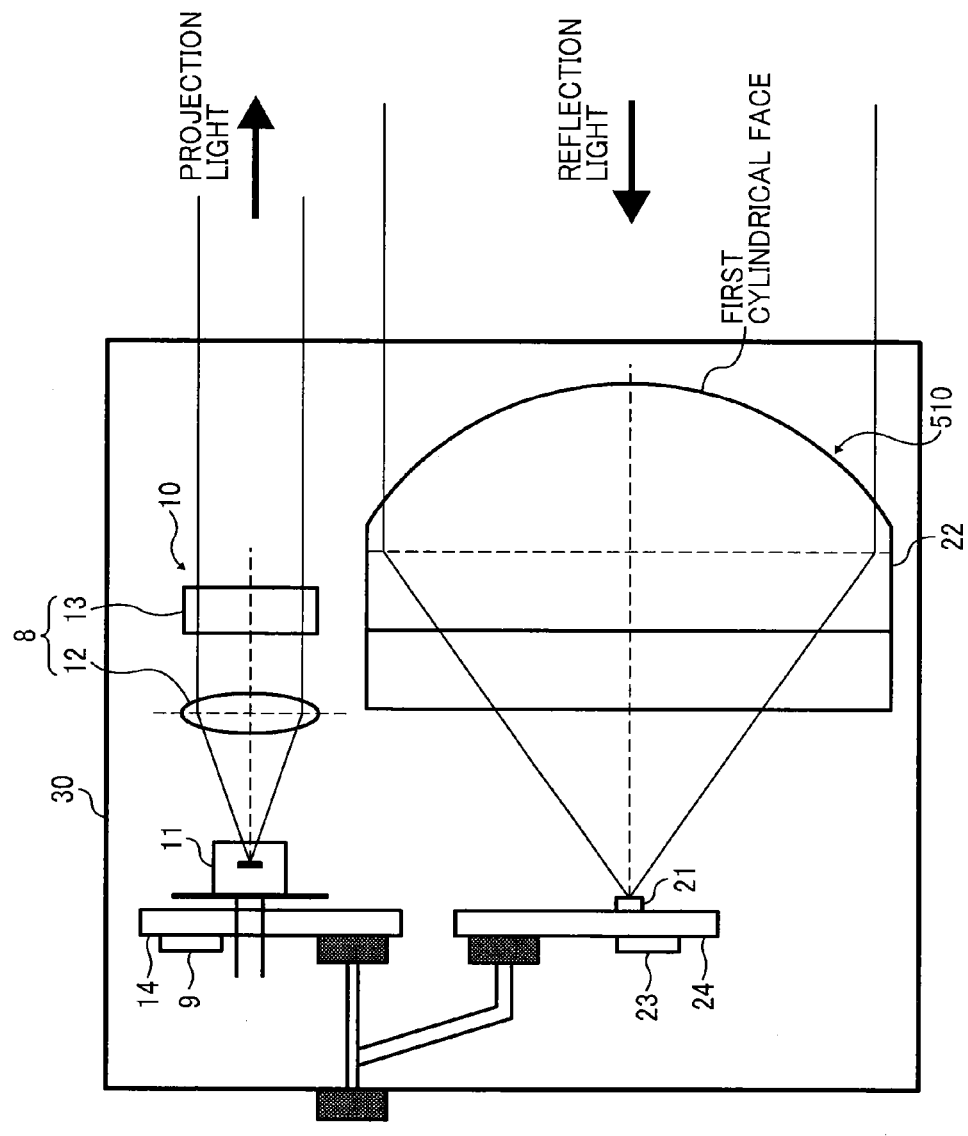
FIG. 10 shows a schematic configuration of a light receiving unit of one type of a fourth variant example.
Figure 11:
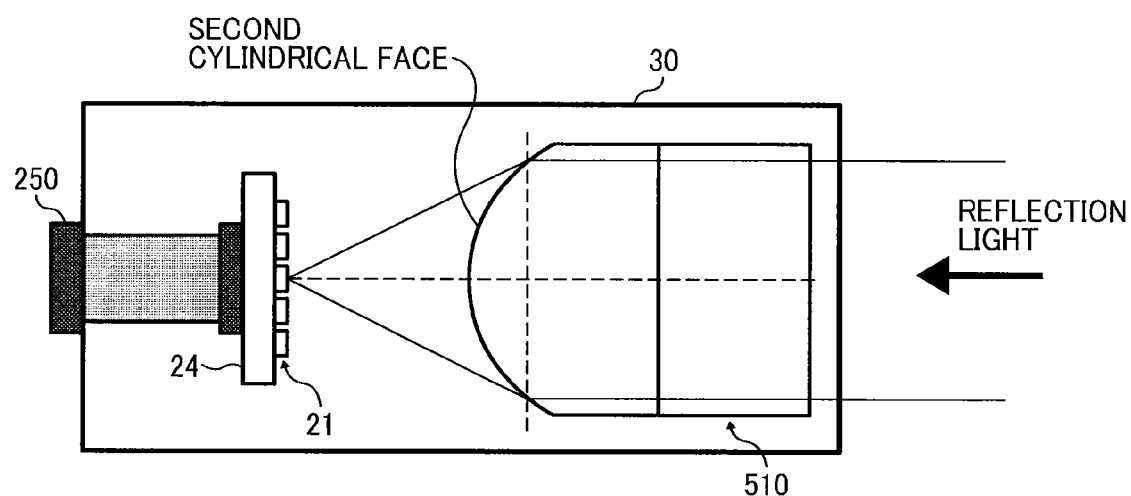
FIG. 11 shows a schematic configuration of a light receiving unit of another type of a fourth variant example.
Figure 11:
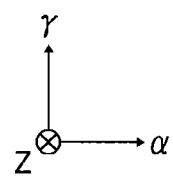

Compared to the above described example embodiment, in the fourth variant example, as shown in FIGS. 10 and 11, a configuration of a condensing lens of the light condensing system is differentiated.

A condensing lens 510, an example of a condensing element, of the fourth variant example has an incidence face as a first cylindrical face, and an exit face as a second cylindrical face.

The first cylindrical face is curved so that the αZ cross-section is convexed to +α side, and has positive refractive power in the Z-axis direction (see FIG. 10). The second cylindrical face is curved so that the αγ cross-section is convexed to −α side, and has positive refractive power in the γ-axis direction (see FIG. 11).

In the fourth variant example, a part of the light reflected from other vehicles is condensed in the vertical direction (Z-axis direction) by the first cylindrical face, and condensed in the horizontal direction (γ-axis direction) by the second cylindrical face, and enters the PD 21. By condensing the light at the first cylindrical face far from the PD 21 at first in the vertical direction corresponding to a greater lens width, the first cylindrical face can function as a condensing face having a relatively longer focus. By contrast, by condensing the light at the second cylindrical face near the PD 21 later in the horizontal direction corresponding to a smaller lens width, the second cylindrical face can function as a condensing face having a short focus. When the second cylindrical face is a spherical shape, spherical aberration when condensing parallel light becomes great. Therefore, the second cylindrical face is preferably shaped into an aspherical lens that can correct aberration.

In the fourth variant example, because the condensing lens 510 has the incidence face and the exit face having condensing directions perpendicular to each other, compared to the third variant example, the number of parts can be reduced, and an adjustment process of the optical axis of the light condensing system can be simplified, and can reduce the manufacturing cost of apparatus.

Further, a positional relationship of the first and second cylindrical faces can be inverted for the fourth variant example. For example, the first cylindrical face can be at the exit face, and the second cylindrical face can be at the incidence face.

(Fifth Variant Example)

Figure 12:
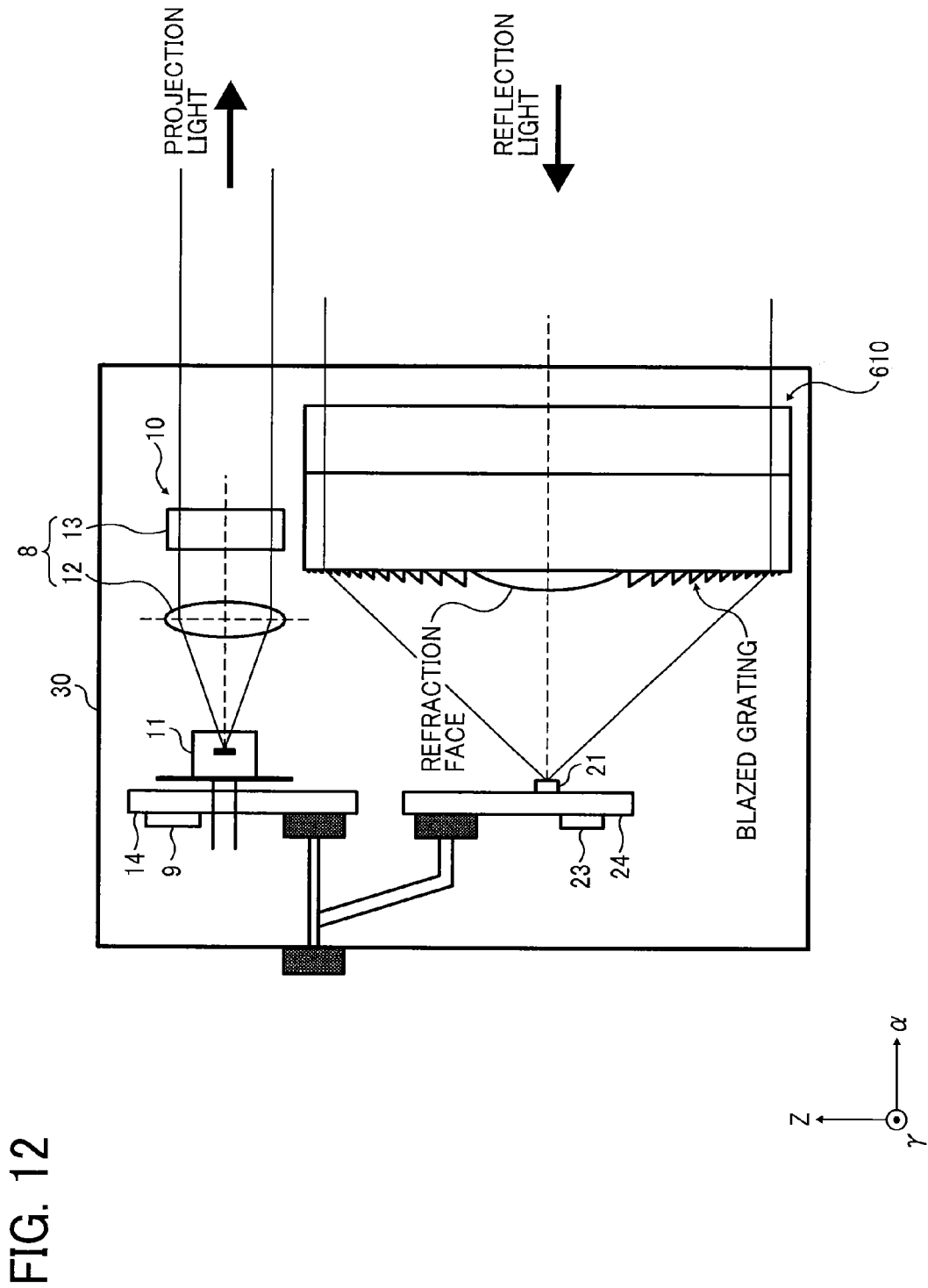
FIG. 12 shows a schematic configuration of a light receiving unit of one type of a fifth variant example.
Figure 13:
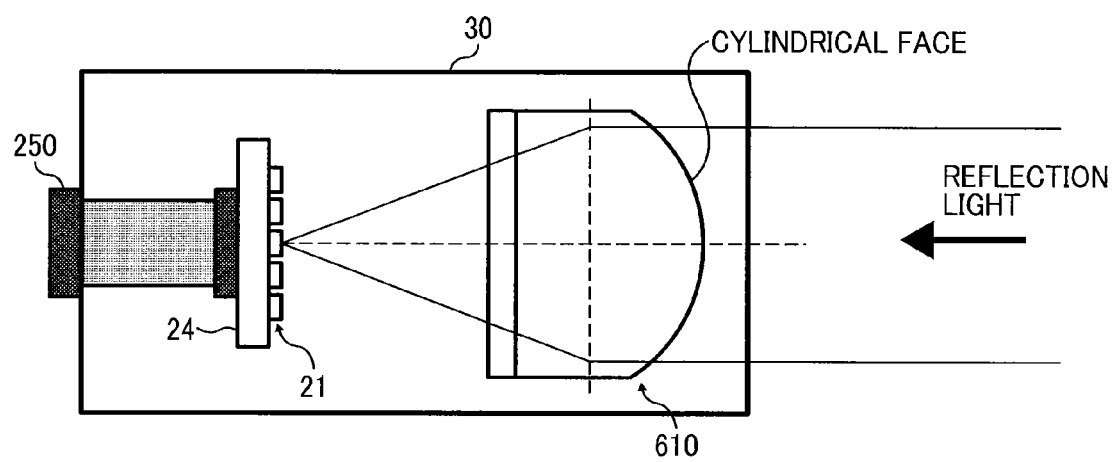
FIG. 13 shows a schematic configuration of a light receiving unit of another type of a fifth variant example.
Figure 13:
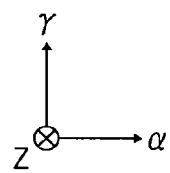

Compared to the above described example embodiment, in the fifth variant example, as shown in FIGS. 12 and 13, a configuration of the light condensing system is differentiated.

In the fifth variant example, the light condensing system is configured with a light condensing element 610. The light condensing element 610 has an incidence face as a cylindrical face having a spherical shape or an aspherical shape, and condenses the reflection light in the horizontal direction (see FIG. 13). Further, the light condensing element 610 has an exit face formed with a blazed grating to condense the laser beam in the vertical direction.

In the distance measurement apparatus of the above described example embodiment and each variant example, the horizontal direction is divided in a plurality of areas. To separate the distance detection angle range with high precision, the resolution level in the horizontal direction is required to be enhanced when condensing the reflection light by the light condensing element 610. Because it is preferable to remove the effect of aberration as much as possible when condensing the reflection light in the horizontal direction, condensing using the incidence face of a condensing lens far from the PD 21 is preferable.

As for the vertical direction, it is sufficient if the reflection light is guided in the light receiving area of the PD 21, and therefore, the enhanced resolution level is not required for the vertical direction compared to the horizontal direction. Therefore, condensing of the reflection light in the vertical direction is preferably conducted by the exit face of a condensing lens near the PD 21.

However, because the lens width in the vertical direction is great, and the focal length in the vertical direction is required to be a shorter focal length compared to the condensing face (incidence face) in the horizontal direction, the numerical aperture (NA) of lens becomes too great. For example, when a lens is prepared by setting a lens diameter in the vertical direction to 30 mm and a focal length of 10 mm, the numerical aperture (NA) of lens becomes 0.83. The lens having this condensing feature is difficult to prepare with low cost using typical refractive lens such as spherical lens and aspherical lens.

Therefore, in the fifth variant example, the exit face of the light condensing element 610 is formed with a blazed grating having positive diffractive power in the Z-axis direction. By using light deflection effect by diffraction, the reflection light from other vehicle is condensed in the Z-axis direction, and guided to the PD 21.

FIG. 14 schematically shows condensing of laser beam by the blazed grating in one axis direction. As for the blazed grating, the grating pitch d and the grating height h for obtaining the diffraction angle β can be computed by the above formulas (1) and (2).

Figure 15:
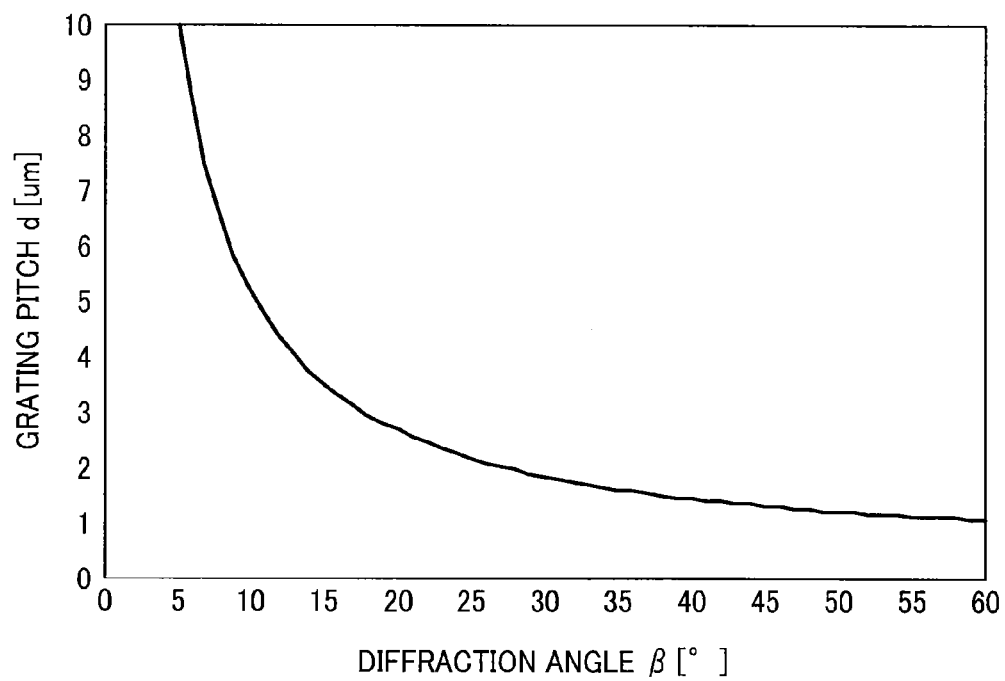
FIG. 15 shows an example profile indicating a relationship between diffraction angle of a blazed grating and grating pitch.
Figure 16:
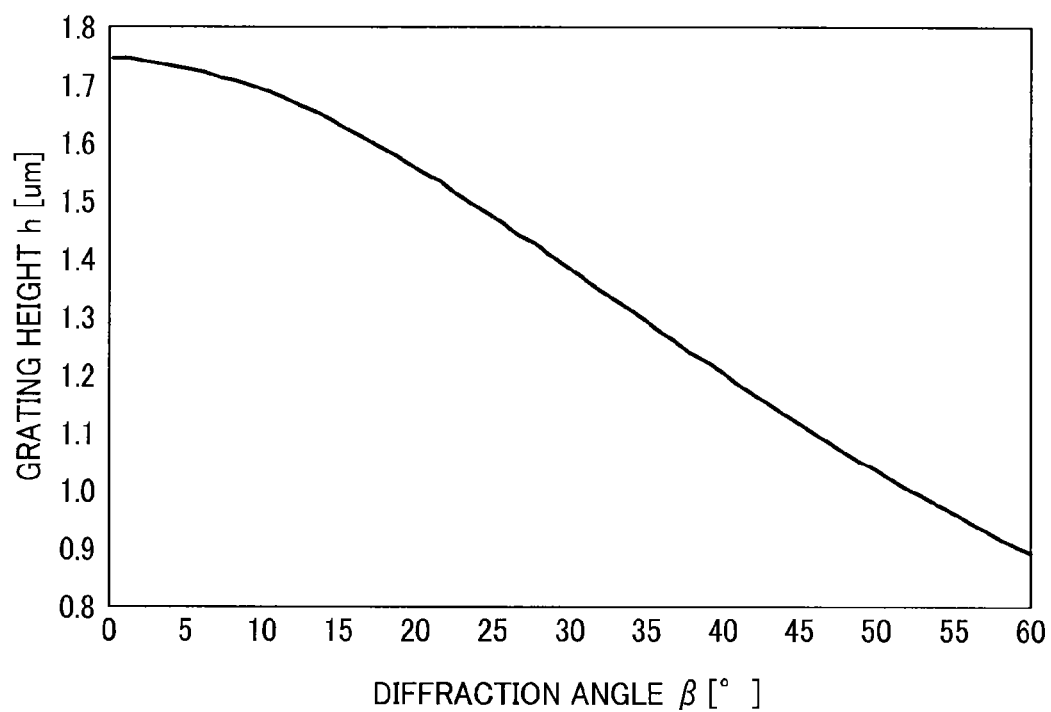
FIG. 16 shows an example profile indicating a relationship between diffraction angle of a blazed grating and grating height.

FIG. 15 shows a relationship between the diffraction angle β and the grating pitch d, and FIG. 16 shows a relationship between the diffraction angle β and the grating height h, in which the laser beam having a wavelength of 905 nm is used, a diffraction degree is set 1, and the refractive index of lens material is set 1.52.

The diffraction angle β can be set based on the grating pitch d and the grating height h of the blazed grating as shown in FIGS. 15 and 16.

By forming a blazed grating having a greater diffraction angle as far from the center of the condensing lens on the exit face of the light condensing element 610, which means by forming a blazed grating having a smaller grating pitch d and a smaller grating height h as far from the center of the condensing lens on the exit face of the light condensing element 610, the parallel light entered in the blazed grating can be condensed in a smaller area.

For example, as for a lens having NA=0.83, the diffraction angle is about 56 degrees at the most outer area within the effective area, and the grating pitch of 1.1 μm and grating height of 0.94 μm are set. By setting the grating pitch d and the grating height h at each area in the lens face, the parallel light entered into the light condensing element 610 can be condensed to the PD 21.

Further, the center and its surrounding area of the light condensing element 610 has a small NA, and the light can be condensed by the refraction face.

In the fifth variant example, as shown in FIG. 12, the center and its surrounding area of the exit face of the light condensing element 610 is formed with a refraction face having spherical or aspherical shape, and the blazed grating is formed outside the refraction face. In this configuration, a shorter focus in the Z-axis direction can be achieved, and the light condensing element 610 can be disposed closer to the PD 21, with which the apparatus can be compact in size. Further, instead of the refraction face, the blazed grating can be formed on the center and its surrounding area of the exit face of the light condensing element 610.

Typically, plastic materials can be used as lens materials to prepare the light condensing element with low cost. The above described light condensing element having the blazed grating can be formed by the injection molding that can be conducted with low cost.

In the fifth variant example, a compact distance measurement apparatus that can divide the light receiving angle range in the horizontal direction with high precision can be provided with low cost.

Further, in the fifth variant example, the blazed grating is formed on the exit face of the light condensing element, but instead the blazed grating can be formed on the incidence face of the light condensing element, or the blazed grating can be formed on both of the exit face and the incidence face of the light condensing element. Further, when the blazed grating is formed on the incidence face of the light condensing element, the exit face of the light condensing element can be formed as a cylindrical face.

(Sixth Variant Example)

Figure 17:
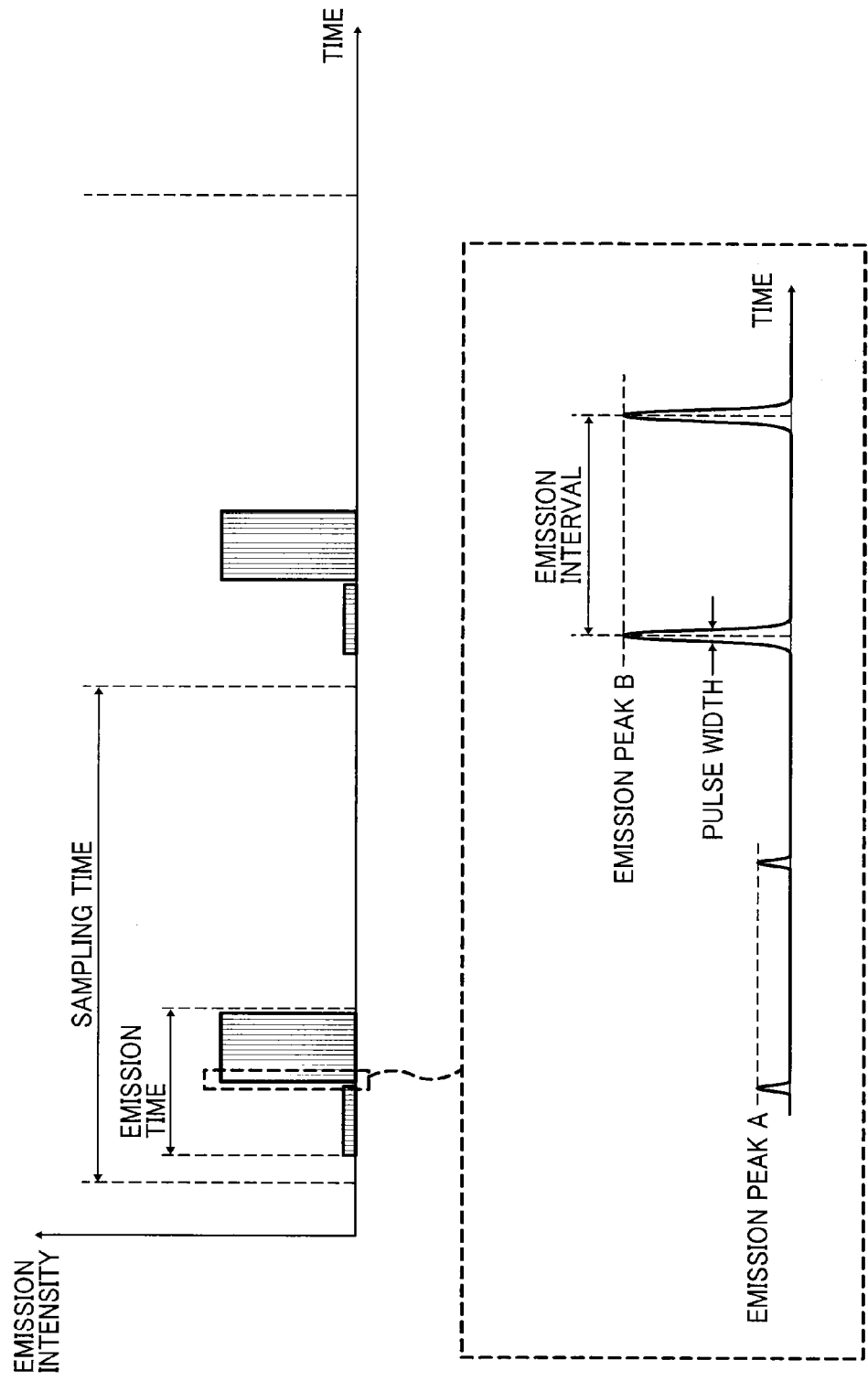
FIG. 17 shows an example of timing chart and light intensity of LD of a sixth variant example.

Compared to the above described example embodiment, in the sixth variant example, as shown in FIG. 17, the emission method of the LD 11 is differentiated.

FIG. 17 schematically shows waveform of laser beam modulated in time line for a distance measurement apparatus of the sixth variant example (hereinafter, time line waveform).

As described above, distance information obtained by the distance measurement apparatus is transmitted to the vehicle-control ECU at each given sampling time. In the sampling time, the LD 11 emits light for a give time (hereinafter, the emission time). In the emission time, a light pulse (laser beam) having a given emission peak and pulse width is repeatedly emitted with a constant time interval (emission interval) and transmitted.

Specifically, the pulse width of light pulse is, for example, several nano seconds to several tens nano seconds, and the emission interval is, for example, several μsec to several tens μsec. Further, the sampling time is, for example, about 30 msec in view of refresh rate of camera. For example, when the light pulse is emitted with the emission interval of 10 μsec for 300 times, the time that the light pulse is actually emitted in the sampling time becomes 3 msec. By projecting a plurality of light pulses within a short time period, and averaging the received light signal for each reflection light, a signal-to-noise (SN) ratio of received light signal can be enhanced, and the distance measurement can be conducted with high precision.

As for the typical distance measurement apparatus, it is designed to irradiate laser beams to a target positioned about several tens meters away, and therefore, the emission peak of LD may be maintained at a relatively great value such as several tens watt (W).

However, it is preferable that the distance measurement apparatus can correctly measure distance to a target positioned near the apparatus (e.g., within 1 m). In this case, if a light pulse having a greater emission peak is irradiated to the target, the intensity of reflection light becomes too great, with which the reflection light intensity exceeds the maximum light intensity that can be detected by PD. When this reflection light is received, the received light signal has a waveform that the output is saturated for a given time, and further, the electrical noise (shot noise) due to the light input increases. Therefore, distance measurement precision for the target positioned near the apparatus deteriorates significantly.

In view of such situation, in the sixth variant example, different time zones such as two time zones having different emission peaks for the light pulse are set for the emission time. The time zone having a small emission peak is used to detect the target positioned near the distance measurement apparatus, and the time zone having a great emission peak is used to detect the target positioned far from distance measurement apparatus.

Specifically, before setting a normal detection time zone (i.e., time zone having a great emission peak) for normal distance detection, a near-field detection time zone (i.e., time zone having a small emission peak) for detecting distance to the target positioned near the apparatus is set. In the near-field detection time zone, the emission peak of LD is set smaller compared to the normal detection time zone. Specifically, the emission peak for the normal detection time zone is, for example, from 30 W to 100 W, and the emission peak for the near-field detection time zone is, for example, 1 W or less. Typically, the smaller the emission peak, the time line waveform of pulse can be generated with high precision, and the occurrence of electrical noise of a LD drive circuit becomes smaller. Further, because the shot noise due to the inputting of reflection light becomes smaller, the distance measurement precision near the apparatus can be enhanced.

Further, when the distance measurement is conducted, detection near the apparatus using the near-field detection time zone is conducted at first. If an effective received light signal is obtained at this timing, which means if the target is positioned near the apparatus, a measurement data using the near-field detection time zone is used, and a measurement data detected using the normal detection time zone for the next timing is discarded. By contrast, if an effective received light signal is not obtained using the near-field detection time zone, which means if the target is not positioned near the apparatus, a measurement data detected using the normal detection time zone is used.

In the sixth variant example, by setting the two time zones having different emission peaks in the emission time, a capturing distance of distance measurement for other vehicle can be set longer, and the distance measurement near the apparatus can be conducted with high precision.

Further, in the sixth variant example, the two time zones having different emission peaks are set in the emission time, but three or more time zones can be set. In this case, the distance measurement can be conducted by using emission peak depending on distance to other vehicle, with which distance detection precision can be enhanced. In this case, given emission peaks can be set to given time zones.

Further, in the sixth variant example, the time zone for smaller emission peak comes first, but the time zone for greater emission peak can come first.

(Seventh Variant Example)

Figure 18:
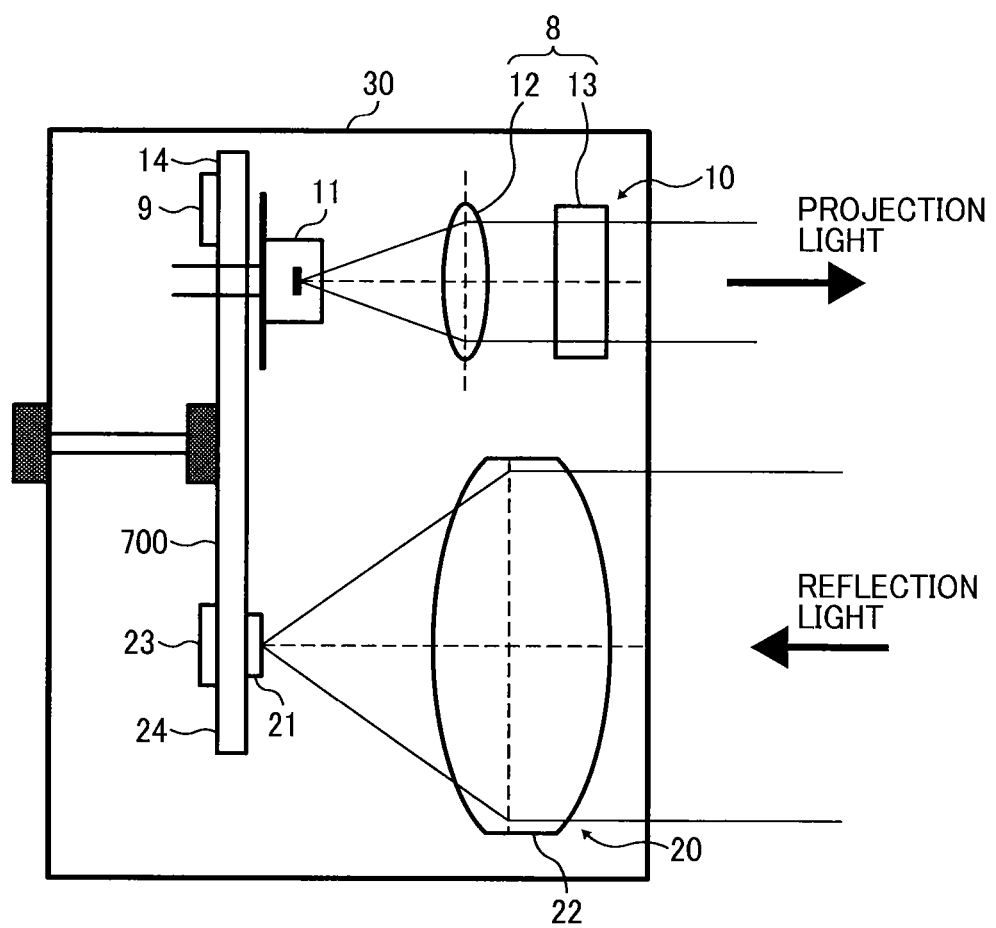
FIG. 18 shows a schematic configuration of a laser system of a seventh variant example.

Compared to the above described example embodiment and each variant example, in the seventh variant example, as shown in FIG. 18, the laser system is differentiated by disposing the LD drive circuit 9 and the signal amplification circuit 23 on the same base plate.

In the laser system of the seventh variant example, the LD drive circuit 9 and the signal amplification circuit 23 are disposed on the same base plate while positioned closer with each other.

In the seventh variant example, by reducing the number of base plates (circuit boards) in the laser system, the number of parts and connection processing of connectors can be reduced, and it can reduce the manufacturing cost of apparatus.

Further, in the above described example embodiment and each variant example, the distance measurement apparatus includes, for example, the casing 300 such as the box member to encase a plurality of the laser systems with a given positional relationship. Instead, the distance measurement apparatus can include, for example, a holding frame holding a plurality of the laser systems with a given positional relationship.

Further, in the above described example embodiment and each variant example, the light-permeable window member can be equipped on an opening of a wall at +Y side of the casing. But the light-permeable window member can be omitted, in which projection light and reflection light pass through the opening.

In the above described example embodiment and each variant example, the light receiving angle range in the horizontal direction is divided into five, but not limited hereto. The light receiving angle range in the horizontal direction can be divided into any numbers.

Further, in the above described example embodiment and each variant example, the light receiving angle range in the horizontal direction is divided into five. Instead, the light receiving angle range in the vertical direction can be divided into five, or both of the light receiving angle range in the horizontal direction and the light receiving angle range in the vertical direction can be divided into five Further, in the above described example embodiment and each variant example, a plurality of laser systems are arranged in the X-axis direction. However, the disposition of the laser systems is not limited hereto. Thus, for example, a plurality of laser systems can be arranged in a direction other than the X-axis direction.

Further, in the above described example embodiment and each variant example, a plurality of laser systems are arranged in the X-axis direction. However, the disposition of the laser systems is not limited hereto. Further, for example, a plurality of laser systems arranged in the X-axis direction can be stacked with another plurality of laser systems along the Z-axis direction.

In the above described example embodiment and each variant example, the waveform of the laser beam modulated in time is a pulse wave that emits light having a pulse width of a short time period (several nano seconds to several tens of nano seconds) with a constant time interval (emission interval). However, the waveform is not limited hereto. Thus, for example, the waveform of laser beam modulated may be an intensity modulated wave applied to LD such as sine wave and triangle wave, and the intensity modulated laser beam can be emitted.

In the above described example embodiment and each variant example (excluding the second variant example), the divergence angle of a plurality of laser beams projected from the distance measurement apparatus is set equal, but the divergence angle can be set differently.

A configuration of laser systems of the above described example embodiment and each variant example can be changed. For example, the holding member is not limited to the box member of rectangular parallelepiped shape, but others such as a holding frame can be used. Further, at least one of the light emission unit and the light receiver may not be encased in the holding member. Further, the light emission unit and the light receiver are integrated, but can be provided separately. Further, a positional relationship of the light emission unit and the light receiver can be changed as required. Further, a configuration of the light emission unit and the light receiver unit can be changed as required. For example, at least one of the members of the light condensing system such as the coupling lens 12 and the cylindrical lens 13 can be omitted.

In the above described example embodiment and each variant example, an edge emitting semiconductor laser (LD) is used as the light source, but other lasers such as surface-emitting semiconductor laser, for example, vertical-cavity surface-emitting laser (VCSEL) can be used as the light source.

In the above described example embodiment and each variant example, the projection angle range and the light receiving angle range for each of the laser systems is set 20 degrees or 40 degrees. However, the angle ranges are not limited thereto. Preferably, the projection angle range and the light receiving angle range are from 10 degrees to 50 degrees, and more preferably from 20 degrees to 40 degrees.

In the above described example embodiment and each variant example, the light receiving face of PD is divided into a plurality of areas. The PD may preferably include, for example, a plurality of light receiving portions.

In the above described example embodiment and each variant example, the photodiode (PD) is used as the light receiving element, but is not limited hereto. For example, a photo transistor or the like can be used as the light receiving element.

In the above described example embodiment and each variant example, the distance measurement apparatus includes two or four laser systems but the apparatus is not limited hereto. For example, the distance measurement apparatus can include any number of laser systems such as three, five or the like. In this case, the optical paths of a plurality of projection lights (laser beams) are arranged along the XY plane, with which a greater projection angle range corresponding to the number of laser beams and the divergence angle of each of the laser beams can be obtained.

In the above described example embodiment and each variant example, a plurality of laser systems are arranged without overlapping the projection angle ranges, but the two adjacent projection angle ranges can be overlapped a little to prevent a measurement gap.

In the above described example embodiment and each variant example, the incidence face of the cylindrical lens 13 has negative refractive power, but the exit face of the cylindrical lens 13 can have negative refractive power, or both of the incidence face and the exit face of the cylindrical lens 13 can have negative refractive power.

In the first and second variant examples, a plurality of laser systems are arranged so that the exit directions of LD 11 are parallel to each other in the XY plane, but are not limited hereto. For example, the exit directions of LD 11 can be arranged non-parallel to each other in the XY plane.

In the above described example embodiment and each variant example, the optical paths of plurality of projection lights are arranged radially along the XY plane, but are not limited hereto. For example, the optical paths of plurality of projection lights can be arranged radially along a virtual plane other than the XY plane.

In the above described example embodiment and each variant example, the distance to a plurality of portions in a given area of a target can be measured with a short time period while suppressing cost.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A distance measurement apparatus to measure distance to a target by irradiating laser beams to the target and receiving a reflection light reflected from the target, the distance measurement apparatus comprising:

a light projection unit including a plurality of light emission units to project a plurality of laser beams onto the target while setting optical paths of the plurality of laser beams radially along a given virtual plane, each of the light emission units including a light source and a projection optical system disposed on an optical path of the laser beam emitted from the light source; and a light receiving unit including a plurality of light receivers to receive the plurality of laser beams, projected from the light projection unit and reflected by the target, each one of the plurality of light receivers provided for a corresponding one of the plurality of light emission units, wherein the plurality of light receivers is disposed separately in a direction perpendicular to the virtual plane with respect to the corresponding plurality of light emission units, wherein each of the plurality of light receivers includes a light receiving element provided for the light source of the corresponding light emission unit, and a light condensing system to condense laser beams, projected from the corresponding light source and reflected by the target, onto the light receiving element, wherein each of the light receiving elements includes a plurality of light receiving portions arranged along one axis direction parallel to the virtual plane, wherein the light condensing system includes a first cylindrical lens and a second cylindrical lens, wherein the first cylindrical lens condenses laser beams to a direction perpendicular to the one axis direction, and the second cylindrical lens, disposed separately with respect to the first cylindrical lens in a direction parallel to an exit direction of the corresponding light source, condenses the laser beams to the one axis direction.

2. The distance measurement apparatus of claim 1, wherein each of the plurality of laser beams projected from the light projection unit has a given divergence angle along the virtual plane.

3. The distance measurement apparatus of claim 2, wherein the divergence angle ranges from 20 degrees to 40 degrees.

4. The distance measurement apparatus of claim 1, wherein the exit directions of the light sources of the plurality of light emission units are not parallel to each other.

5. The distance measurement apparatus of claim 1, wherein the light projection unit further includes a deflector disposed on optical paths of laser beams emitted from the plurality of light emission units via the projection optical system, and the deflector deflects the laser beams along the virtual plane.

6. The distance measurement apparatus of claim 5, wherein the deflector is a deflection element formed with a blazed grating on at least one of an incidence face and an exit face of the deflection element.

7. The distance measurement apparatus of claim 5, further comprising a casing and a light-permeable window member, wherein the casing encases the light projection unit and the light receiving unit, wherein the light-permeable window member is provided to the casing while positioned on optical paths of a plurality of laser beams emitted from the plurality of light emission units, wherein the deflector is a blazed grating formed on the light-permeable window member.

8. The distance measurement apparatus of claim 1, wherein the plurality of light emission units and the corresponding plurality of light receivers are integrated into a single unit.

9. The distance measurement apparatus of claim 1, wherein the second cylindrical lens is disposed closer to the light receiving element than is the first cylindrical lens.

10. A distance measurement apparatus to measure distance to a target by irradiating laser beams to the target and receiving a reflection light reflected from the target, the distance measurement apparatus comprising:

a light projection unit including a plurality of light emission units to project a plurality of laser beams onto the target while setting optical paths of the plurality of laser beams radially along a given virtual plane, each of the light emission units including a light source and a projection optical system disposed on an optical path of the laser beam emitted from the light source; and a light receiving unit including a plurality of light receivers to receive the plurality of laser beams, projected from the light projection unit and reflected by the target, each one of the plurality of light receivers provided for a corresponding one of the plurality of light emission units, wherein the plurality of light receivers is disposed separately in a direction perpendicular to the virtual plane with respect to the corresponding plurality of light emission units wherein each of the plurality of light receivers includes a light receiving element provided for the light source of the corresponding light emission unit, and a light condensing system to condense laser beams, projected from the corresponding light source and reflected by the target, onto the light receiving element, wherein each of the light receiving elements includes a plurality of light receiving portions arranged along one axis direction parallel to the virtual plane, wherein the light condensing system has a condensing element having an incidence face and an exit face, wherein the first cylindrical face is formed on one of the incidence face and the exit face to condense laser beams in a direction perpendicular to the one axis direction, and wherein the second cylindrical face is formed on the other one of the incidence face and the exit face to condense the laser beams in the one axis direction.

11. The distance measurement apparatus of claim 10, wherein the first cylindrical face is formed on the incidence face, and the second cylindrical face is formed on the exit face in the light condensing system.

12. A distance measurement apparatus to measure distance to a target by irradiating laser beams to the target and receiving a reflection light reflected from the target, the distance measurement apparatus comprising:

a light projection unit including a plurality of light emission units to project a plurality of laser beams onto the target while setting optical paths of the plurality of laser beams radially along a given virtual plane, each of the light emission units including a light source and a projection optical system disposed on an optical path of the laser beam emitted from the light source; and a light receiving unit including a plurality of light receivers to receive the plurality of laser beams, projected from the light projection unit and reflected by the target, each one of the plurality of light receivers provided for a corresponding one of the plurality of light emission units, wherein the plurality of light receivers is disposed separately in a direction perpendicular to the virtual plane with respect to the corresponding plurality of light emission units, wherein each of the plurality of light receivers includes a light receiving element provided for the light source of the corresponding light emission unit, and a light condensing system to condense laser beams, projected from the corresponding light source and reflected by the target, onto the light receiving element, wherein each of the light receiving elements includes a plurality of light receiving portions arranged along one axis direction parallel to the virtual plane, wherein the light condensing system has a condensing element formed with a blazed grating on an exit face of the condensing element to condense laser beams in a direction perpendicular to the one axis direction.

13. The distance measurement apparatus of claim 12, wherein the condensing element is formed with a cylindrical face on the incidence face of the condensing element to condense laser beams in the one axis direction.

14. The distance measurement apparatus of claim 1, further comprising a distance computing circuit that computes distance to a plurality of portions of the target in the one axis direction based on emission timing of the light source and light receiving timing at each of a plurality of light receiving portions of the corresponding light receiving element.

15. The distance measurement apparatus of claim 1, wherein the projection optical system includes a cylindrical lens, disposed on optical paths of laser beams emitted from the light source, to diffuse light in a direction along the virtual plane.

16. The distance measurement apparatus of claim 15, wherein the projection optical system includes a coupling lens, disposed on optical paths of laser beams between the light source and the cylindrical lens, to set the laser beams to substantially parallel.

* * * * *